United States Patent
Taherzadeh Boroujeni et al.

(10) Patent No.: US 11,963,088 B2
(45) Date of Patent: Apr. 16, 2024

(54) BEAM-SPECIFIC SYSTEM INFORMATION INSIDE REMAINING MINIMUM SYSTEM INFORMATION

(71) Applicant: QUALCOMM Incorporated, San Diego, CA (US)

(72) Inventors: Mahmoud Taherzadeh Boroujeni, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 17/374,858

(22) Filed: Jul. 13, 2021

(65) Prior Publication Data

US 2022/0038998 A1   Feb. 3, 2022

Related U.S. Application Data

(60) Provisional application No. 63/059,536, filed on Jul. 31, 2020, provisional application No. 63/059,852, filed on Jul. 31, 2020.

(51) Int. Cl.
*H04W 48/12* (2009.01)
*H04W 56/00* (2009.01)
*H04W 72/044* (2023.01)
*H04W 72/23* (2023.01)

(52) U.S. Cl.
CPC ......... *H04W 48/12* (2013.01); *H04W 56/001* (2013.01); *H04W 72/046* (2013.01); *H04W 72/23* (2023.01)

(58) Field of Classification Search
CPC . H04W 48/12; H04W 72/046; H04W 56/001; H04W 72/23
See application file for complete search history.

(56) References Cited

U.S. PATENT DOCUMENTS

| | | | |
|---|---|---|---|
| 2019/0037481 A1* | 1/2019 | Zhang | H04L 5/0032 |
| 2019/0159226 A1 | 5/2019 | Ly et al. | |
| 2019/0159264 A1* | 5/2019 | Zhang | H04B 7/06 |
| 2019/0223199 A1* | 7/2019 | Park | H04L 1/1861 |
| 2019/0280836 A1* | 9/2019 | Bhattad | H04W 56/001 |
| 2020/0162931 A1* | 5/2020 | Chakraborty | H04W 48/12 |
| 2020/0275409 A1* | 8/2020 | Gonzalez | H04W 68/025 |
| 2020/0404601 A1 | 12/2020 | Lin et al. | |
| 2021/0037484 A1* | 2/2021 | Zhou | H04L 1/1854 |
| 2021/0175985 A1 | 6/2021 | Yoon et al. | |

\* cited by examiner

*Primary Examiner* — Brenda H Pham
(74) *Attorney, Agent, or Firm* — Procopio, Cory, Hargreaves & Savitch LLP

(57) ABSTRACT

Aspects presented herein may enable the base station to apply coverage enhancement for one or more SSB beam(s) or a subset of SSB beams for broadcasting system information in a more efficient manner, where the base station and the UE may adapt the system information differently for different SSB beams. In one aspect, a UE may receive, from a base station, RMSI indicating beam-specific system information in association with one or more SSB beams for receiving an SSB. Then, the UE may receive the SSB from the base station based on the received RMSI indicating the beam-specific system information.

28 Claims, 20 Drawing Sheets

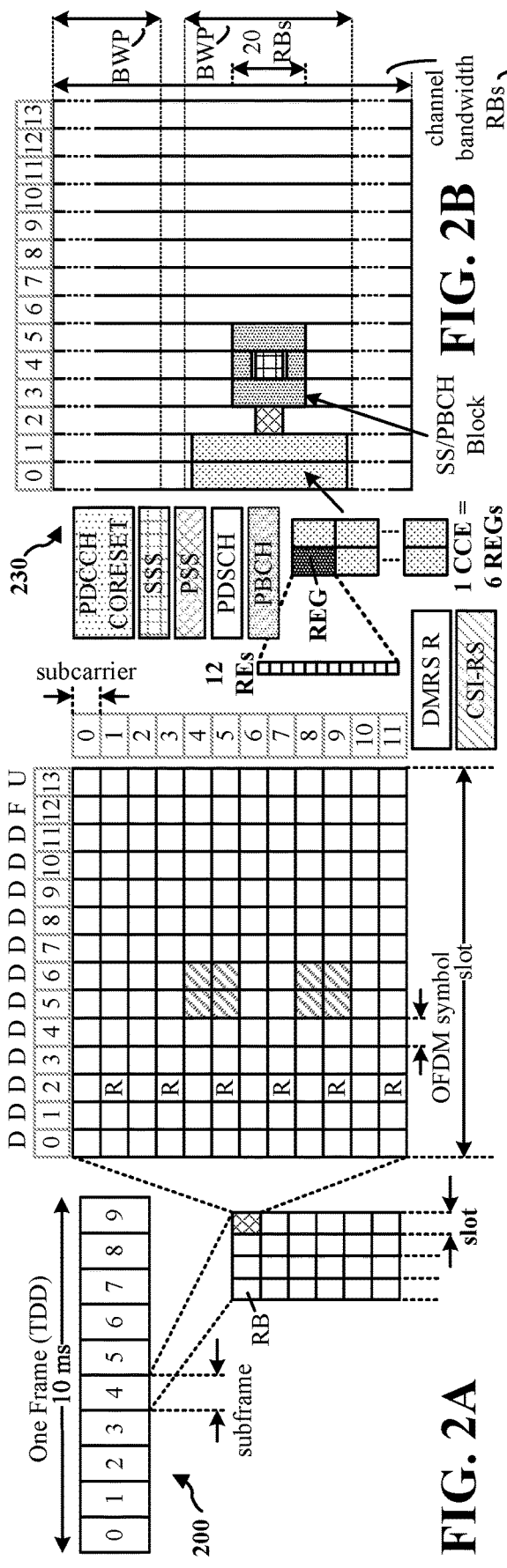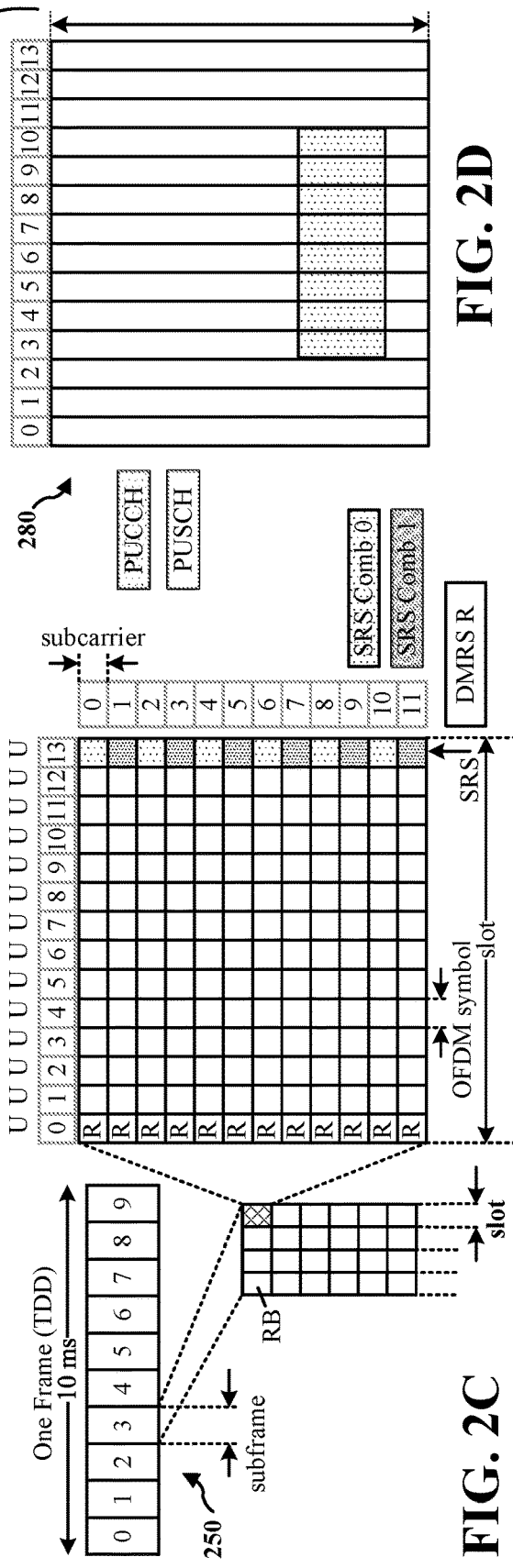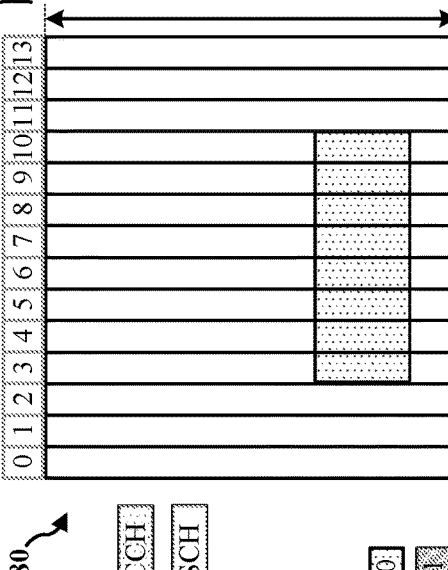

BEAM-SPECIFIC SYSTEM INFORMATION INSIDE REMAINING MINIMUM SYSTEM INFORMATION

CROSS REFERENCE TO RELATED APPLICATION(S)

This application claims the benefit of and priority to U.S. Provisional Application Ser. No. 63/059,536, entitled "BEAM-SPECIFIC SYSTEM INFORMATION INSIDE REMAINING MINIMUM SYSTEM INFORMATION" and filed on Jul. 31, 2020, and U.S. Provisional Application Ser. No. 63/059,852, entitled "BEAM SPECIFIC COVERAGE ENHANCEMENT FOR PAGING" and filed on Jul. 31, 2020, which are expressly incorporated by reference herein in their entirety.

TECHNICAL FIELD

The present disclosure relates generally to communication systems, and more particularly, to a wireless communication involving remaining minimum system information.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided at a user equipment (UE). The apparatus receives, from a base station, remaining minimum system information (RMSI) indicating beam-specific system information in association with one or more synchronization signal block (SSB) beams for receiving an SSB. The apparatus receives the SSB from the base station based on the received RMSI indicating the beam-specific system information.

In an aspect of the disclosure, a method, a computer-readable medium, and an apparatus are provided at a base station. The apparatus transmits, to a first UE, RMSI indicating beam-specific system information in association with one or more SSB beams for receiving an SSB. The apparatus transmits the SSB to the first UE based on the transmitted RMSI indicating the beam-specific system information.

In an aspect of the disclosure, a method, a computer-readable medium, and an apparatus are provided at a UE. The UE establishes a radio resource control connection with a base station. The UE enters an idle mode. The UE monitors for paging from the base station based on a beam used to monitor for the paging.

In an aspect of the disclosure, a method, a computer-readable medium, and an apparatus are provided for wireless communication at a base station. The base station establishes a radio resource control connection with a. The base station may transmit paging to the UE using one or more parameters based on a beam on which the paging is transmitted.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
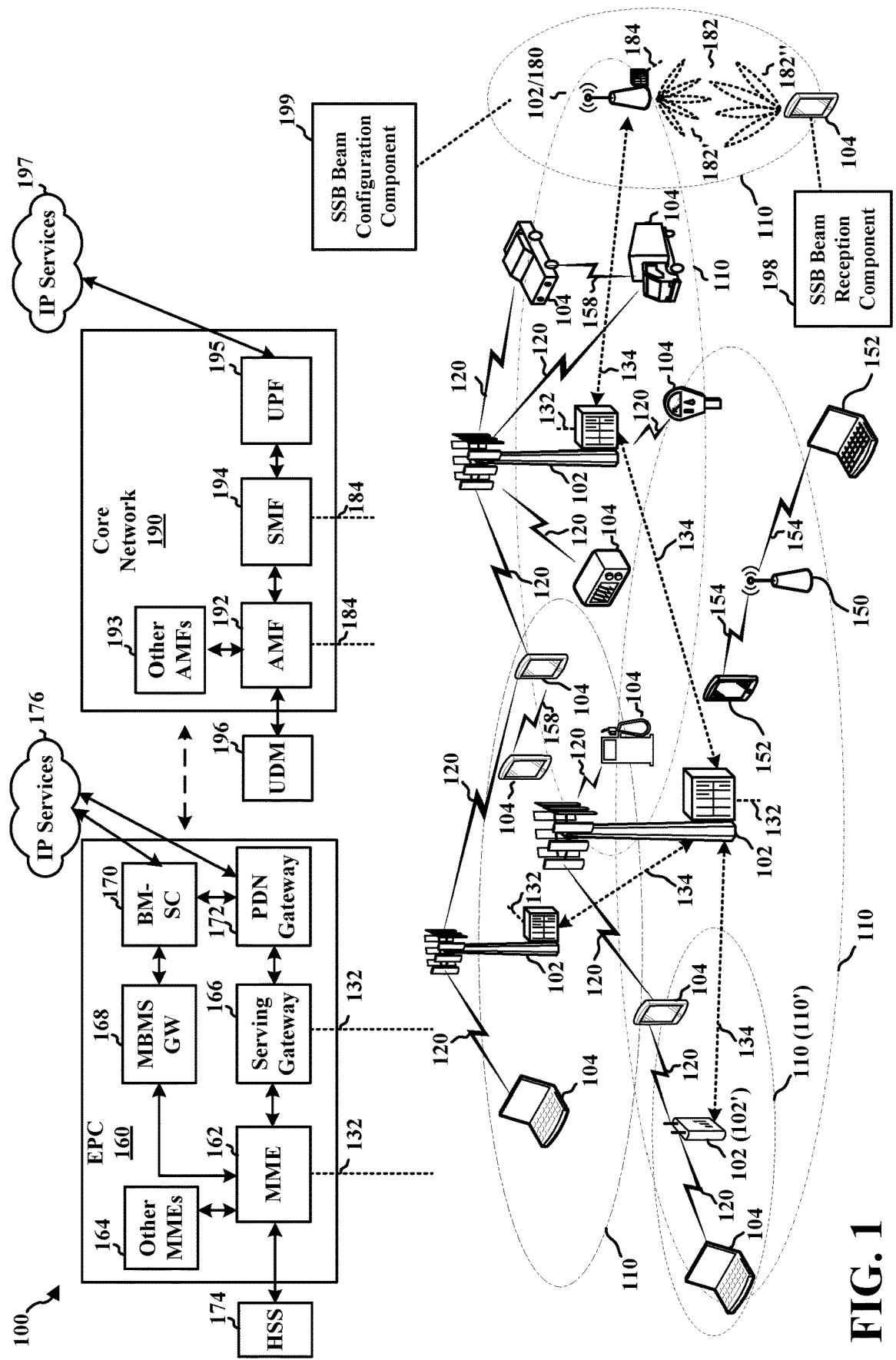
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In certain aspects, the base station 102/180 may include an SSB beam configuration component 199 configured to include beam-specific system information in the RMSI, where the beam-specific system information may be associated with one or more SSB beams for receiving the SSB and may be distinguished by a header which indicates the associated SSB beam index or subset of SSB beams. In one configuration, the SSB beam configuration component 199 may be configured to transmit, to a first UE, RMSI indicating beam-specific system information in association with one or more SSB beams for receiving an SSB. In such configuration, the SSB beam configuration component 199 may be configured to transmit the SSB to the first UE based on the transmitted RMSI indicating the beam-specific system information.

In certain aspects, the UE 104 may include an SSB beam reception component 198 configured to receive the SSB based on the beam-specific system information in a received RMSI. In one configuration, the SSB beam reception component 198 may be configured to receive, from a base station, RMSI indicating beam-specific system information in association with one or more SSB beams for receiving an SSB. In such configuration, the SSB beam reception component 198 may be configured to receive the SSB from the base station based on the received RMSI indicating the beam-specific system information.

In certain aspects, the UE 104 may include a paging monitoring component configured to establish a radio resource control connection with a base station; enter an idle mode; and monitor for paging from the base station based on a beam used to monitor for the paging. In some aspects, the base station 102/180 may include a paging component configured to establish a radio resource control connection with and transmit paging to the UE using one or more parameters based on a beam on which the paging is transmitted.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5GNR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |

-continued

| μ | SCS $\Delta f = 2^\mu \cdot 15$ [kHz] | Cyclic prefix |
|---|---|---|
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology p, there are 14 symbols/slot and $2^\mu$ slots/subframe. The subcarrier spacing may be equal to $2^\mu * 15$ kHz, where y is the numerology 0 to 4. As such, the numerology p=0 has a subcarrier spacing of 15 kHz and the numerology p=4 has a subcarrier spacing of 240 kHz. The symbol length/duration is inversely related to the subcarrier spacing. FIGS. 2A-2D provide an example of normal CP with 14 symbols per slot and numerology p=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
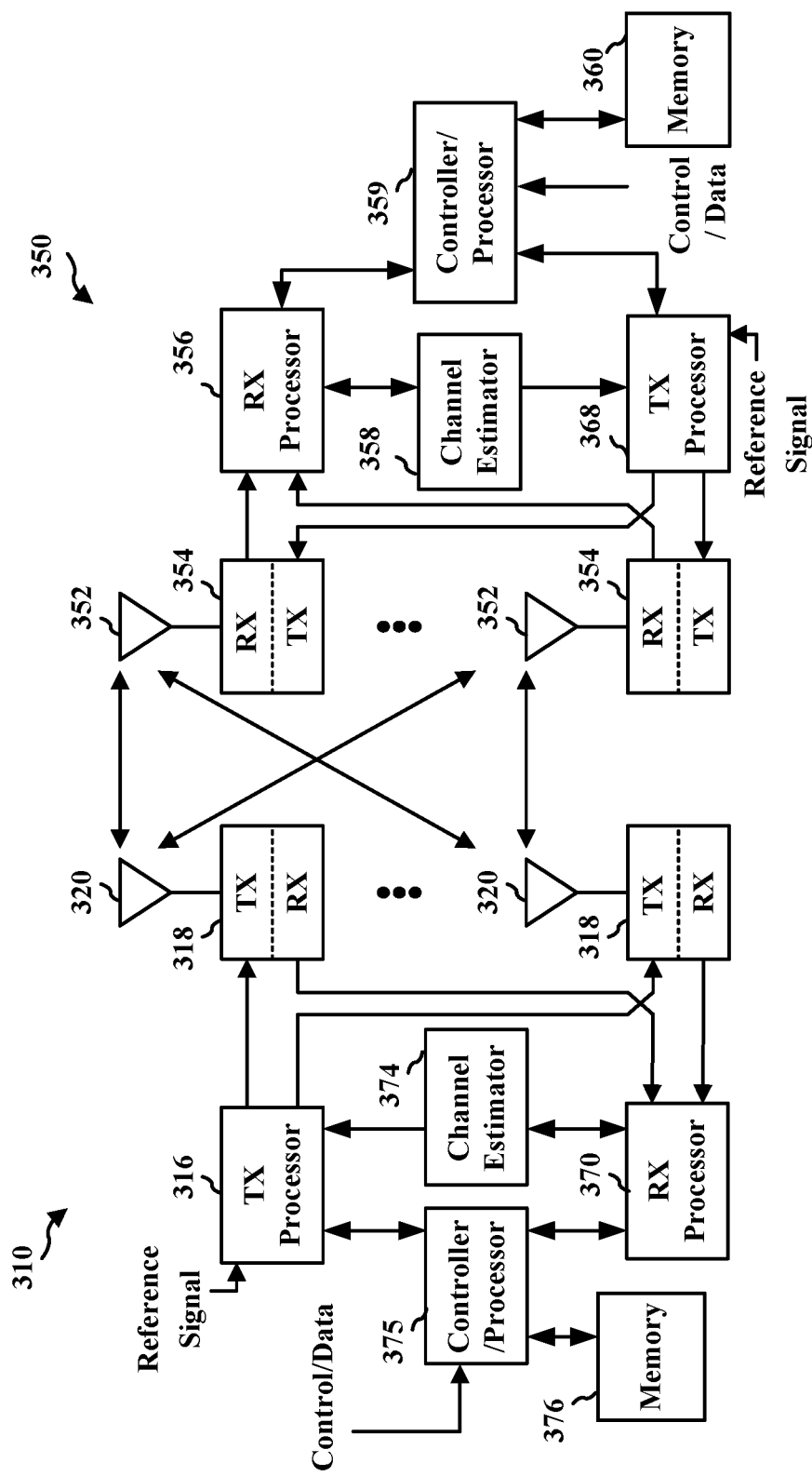
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the SSB beam reception component 198 of FIG. 1.

At least one of the TX processor 316, the RX processor 370, and the controller/processor 375 may be configured to perform aspects in connection with the SSB beam configuration component 199 of FIG. 1.

Figure 4:
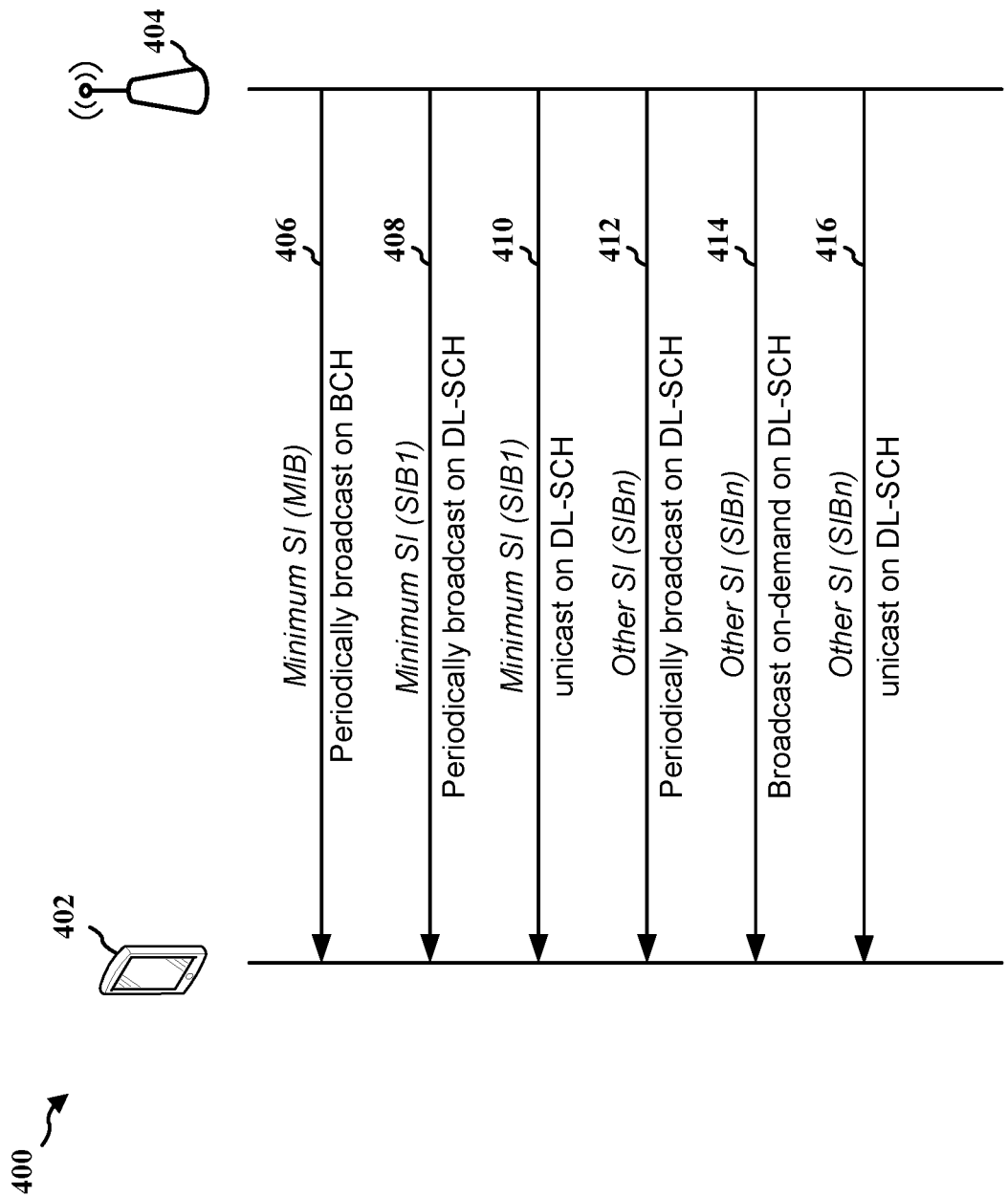
FIG. 4 is a communication flow illustrating an example of system information in accordance with various aspects of the present disclosure.

As described in connection with FIG. 2B, the system information (SI) may include a MIB and a number of SIBs. As shown by the communication flow 400 of FIG. 4, the system information may further be divided into multiple minimum SI (e.g., 406, 408, 410) and other SI (e.g., 412, 414, 416). The minimum SI (e.g., 406, 408, 410) may include basic information for a UE 402's initial access to a cell 404 (e.g., base station) and information for acquiring any other system information. For example, minimum SI may include a MIB 406, which may contain cell barred status information and physical layer information of the cell 404 for receiving further system information (e.g., CORESET #0 configuration). The cell 404 may broadcast the MIB 406 periodically on a broadcast channel (BCH). The minimum SI may also include a SIB1 (e.g., 408 and/or 410), where the SIB1 may define the scheduling of other system information blocks and may contain information for the UE's initial access to a base station, such as the random access parameters. For examples, the SIB1 may include information regarding the availability and scheduling of other SIBs (e.g., mapping of SIBs to SI message, periodicity, SI-window size, etc.). The SIB1 may also indicate whether one or more SIBs is provided based on demand, in which case, it may also provide PRACH configuration for the UE to request for the SI. The SIB1 may further contain RRC information that is common for all UEs and cell barring information applied to the unified access control. The SIB1 (e.g., 408 and/or 410) may be referred to as the remaining minimum SI (RMSI), which may be periodically broadcasted by the cell 404 on a downlink-share channel (DL-SCH) (e.g., using SIB1 408) or transmitted to a dedicated UE (e.g., RRC connected) on the DL-SCH (e.g., using SIB1 410). The other SI (e.g., SIBn 412, 414, 416) may include other SIBs not being broadcasted in the minimum SI (e.g., 406, 408, 410). The other SI may be periodically broadcasted by the cell 404 on the DL-SCH, broadcasted on-demand on the DL-SCH (e.g., requested by the UE 402), or transmitted in a dedicated manner on the DL-SCH to one or more UEs including the UE 402. For example, SIB2 may include cell re-selection information, SIB3 may include information about the serving frequency and intra-frequency of the neighboring cells relevant for cell re-selection, etc.

While a base station (e.g., the base station/cell 180, 404) may operate in millimeter wave frequencies, and/or near millimeter wave frequencies in communication with the UE (e.g., UE 104, 402), the coverage of the communication may deteriorate due to higher path loss, such as when the communication is non-line-of-sight (NLOS) where there may be obstacle(s) between the base station and the UE. Thus, some broadcast channels and stages of initial access and random access channel (RACH) procedures may be configured with coverage enhancement for millimeter-wave transmissions, where the coverage enhancement for broadcast channels and RACH procedures may change at least a portion of the system information.

Figure 5:
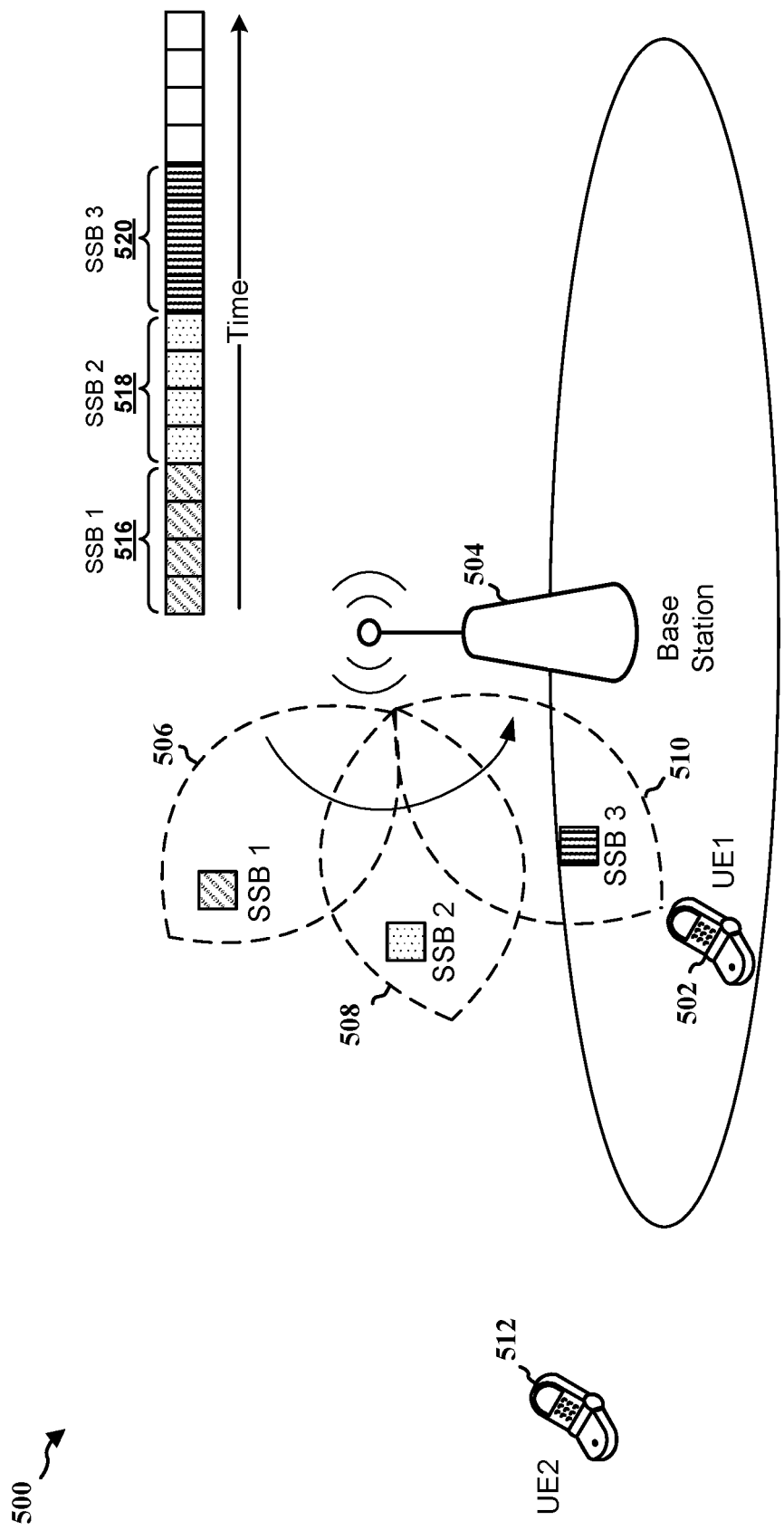
FIG. 5 is a diagram illustrating an example of beam sweeping in accordance with various aspects of the present disclosure.

For example, as shown by a diagram 500 of FIG. 5, a base station 504 may perform beam sweeping in multiple pre-defined directions (e.g., directions of beams 506, 508, 510, etc.) in a burst with regular intervals. During a UE's (e.g., UE 502, 512) initial access to the base station 504, the UE may synchronize with the base station 504 and receive the minimum SI (e.g., 406, 408, 410 in FIG. 4) broadcasted from the base station 504. The base station 504 may transmit (e.g., broadcast) SSBs (e.g., SSBs 516, 518, 520, etc.) that are carrying the PSS, the SSS and the PBCH in predefined directions and period (e.g., 5 ms, 20 ms, etc.) using one or more SSB beams (e.g., beams 506, 508, 510, etc.). For example, the base station 504 may transmit a first SSB (SSB 1) 516 using a beam 506 (e.g., an SSB beam) that is pointing toward a first direction, the base station 504 may transmit a second SSB (SSB 2) 518 using a beam 508 that is pointing toward a second direction, and the base station 504 may transmit a third SSB (SSB 3) 520 using a beam 510 that is pointing toward a third direction, etc. As there may be a worse channel condition in some directions and/or the signal may be specified to reach larger/longer distances in some directions (e.g., toward the UE 512), whether coverage enhancement is to be applied at a base station may depend on the SSB beam(s) (e.g., 506, 508, 510, etc.).

Figure 6:
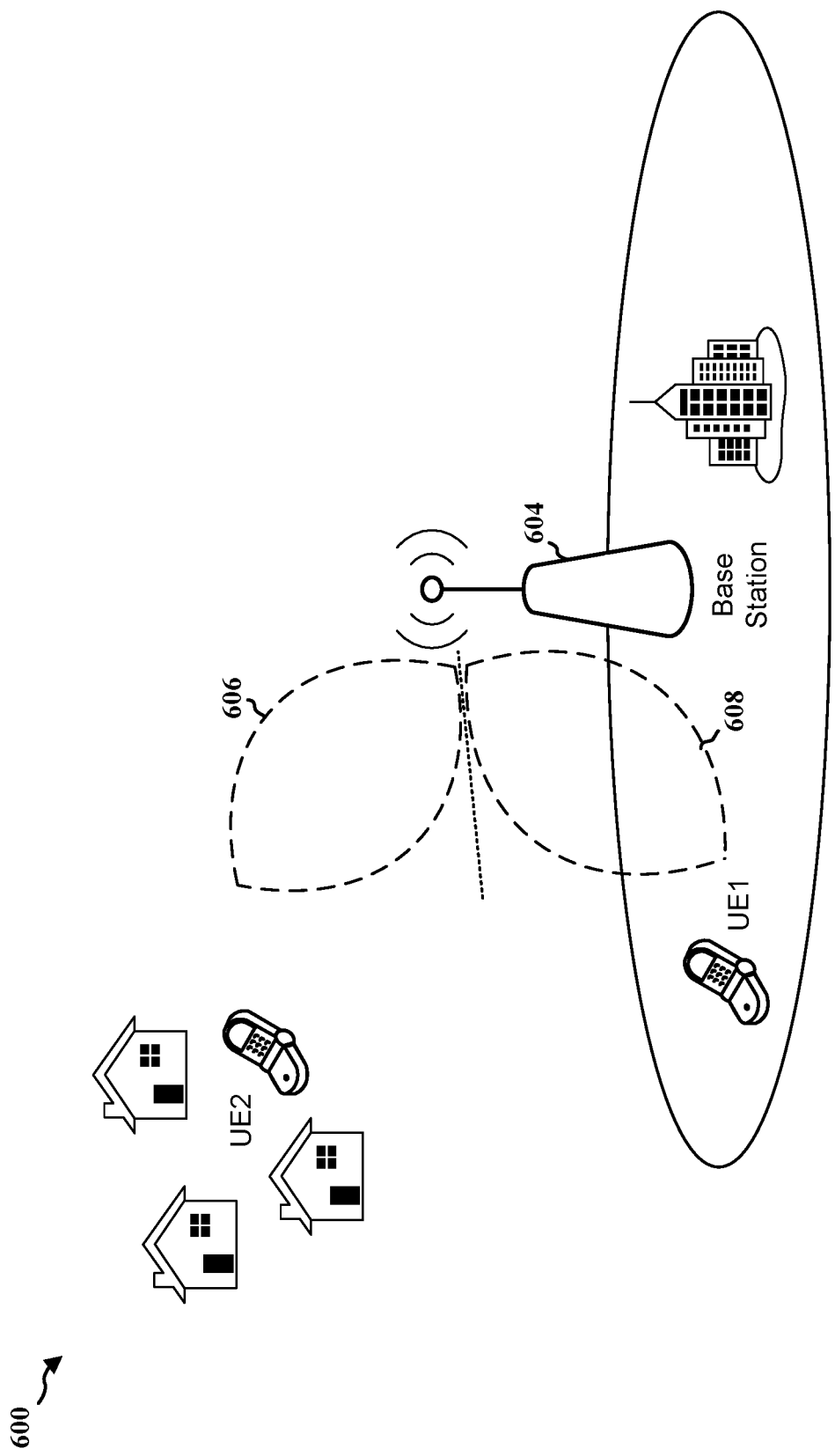
FIG. 6 is a diagram illustrating an example of beam sweeping in accordance with various aspects of the present disclosure.

In some instances, as shown by a diagram 600 of FIG. 6, in a case of two-dimensional (2D) beamforming, an upper subset of SSB beams 606 (e.g., corresponding to approximately half of SSB beams) of the base station 604 may specify a larger coverage (e.g., in a sub-urban environment) than a lower subset of SSB beams 608 (e.g., in a non-sub-urban environment).

Figure 7:
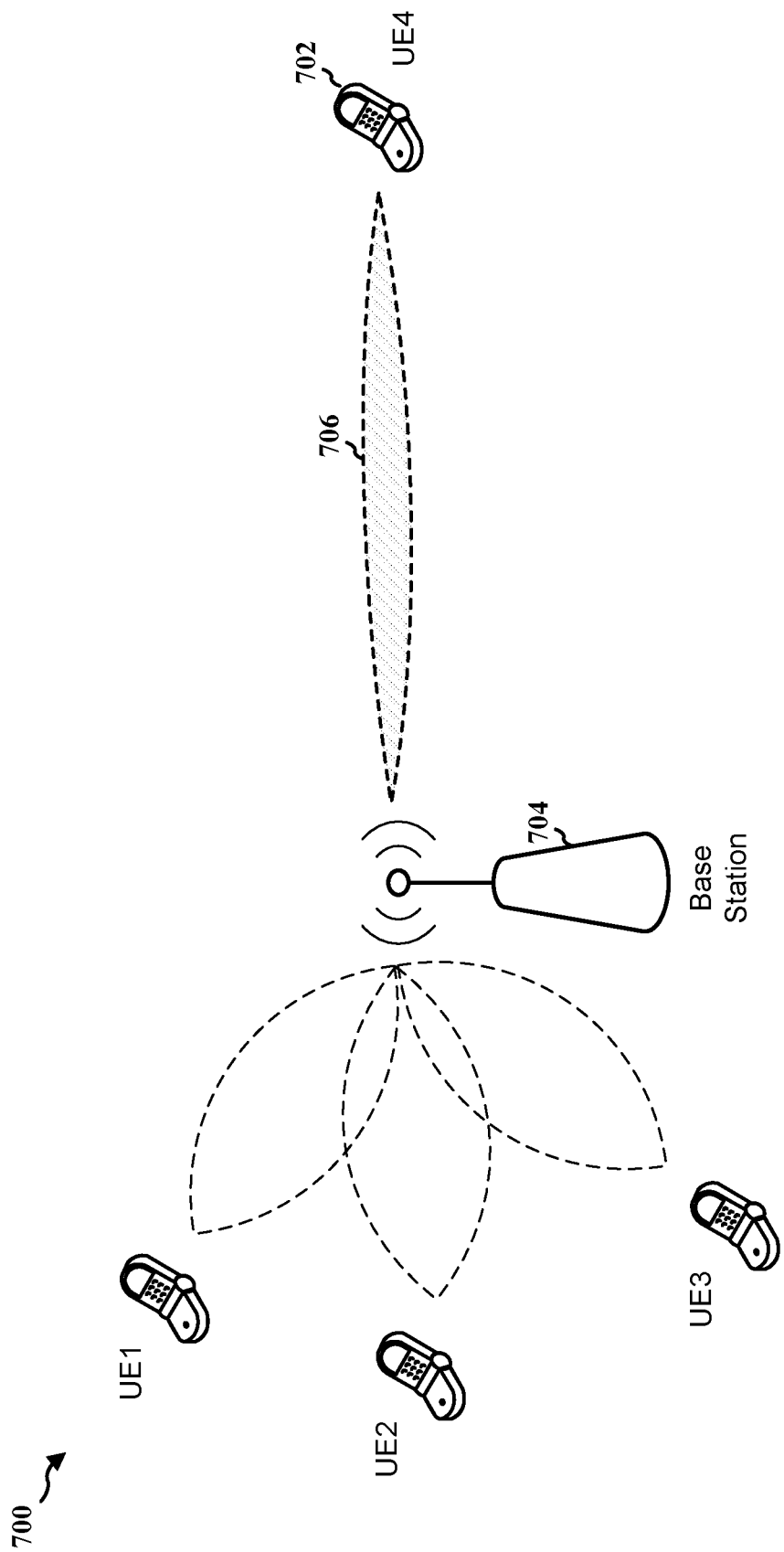
FIG. 7 is a diagram illustrating an example of beam sweeping in accordance with various aspects of the present disclosure.

In other instances, as shown by diagram 700 of FIG. 7, some specific SSB beam(s) (e.g., the beam 706) may specify coverage enhancement for a more distant UE 702. In some examples, due to the shape of a base station 704 (e.g., cell), the coverage area (e.g., size/range of the coverage) of the base station 704 may be different at different directions, where direction with lower/smaller coverage area may specify coverage enhancement. Thus, some SSB beam(s) or subset of SSB beams of the base station 704 may specify more coverage enhancement than other beams for transmitting or broadcasting system information. As such, it may be beneficial to provide coverage enhancement specifically for these SSB beams (e.g., SSB beams in certain directions) instead of applying the coverage enhancement for all SSB beams (which may consume additional resources and/or power).

Aspects presented herein may enable a base station to apply coverage enhancement for one or more SSB beam(s) or a subset of SSB beams for transmitting system information in a more efficient manner. Aspects presented herein may enable the base station and/or the UE to adapt the system information differently for different beams (e.g., SSB beams).

In one aspect, an RMSI (e.g., SIB1 408, 410) may be configured to include extra or additional beam-specific system information in association with one or more SSB beams for receiving an SSB, where the extra or additional beam-specific system information may be distinguished by a header which indicates the associated SSB beam index or subset of SSB beams (e.g., for which the beam-specific system information applies to the one or more SSB beams).

Figure 8:
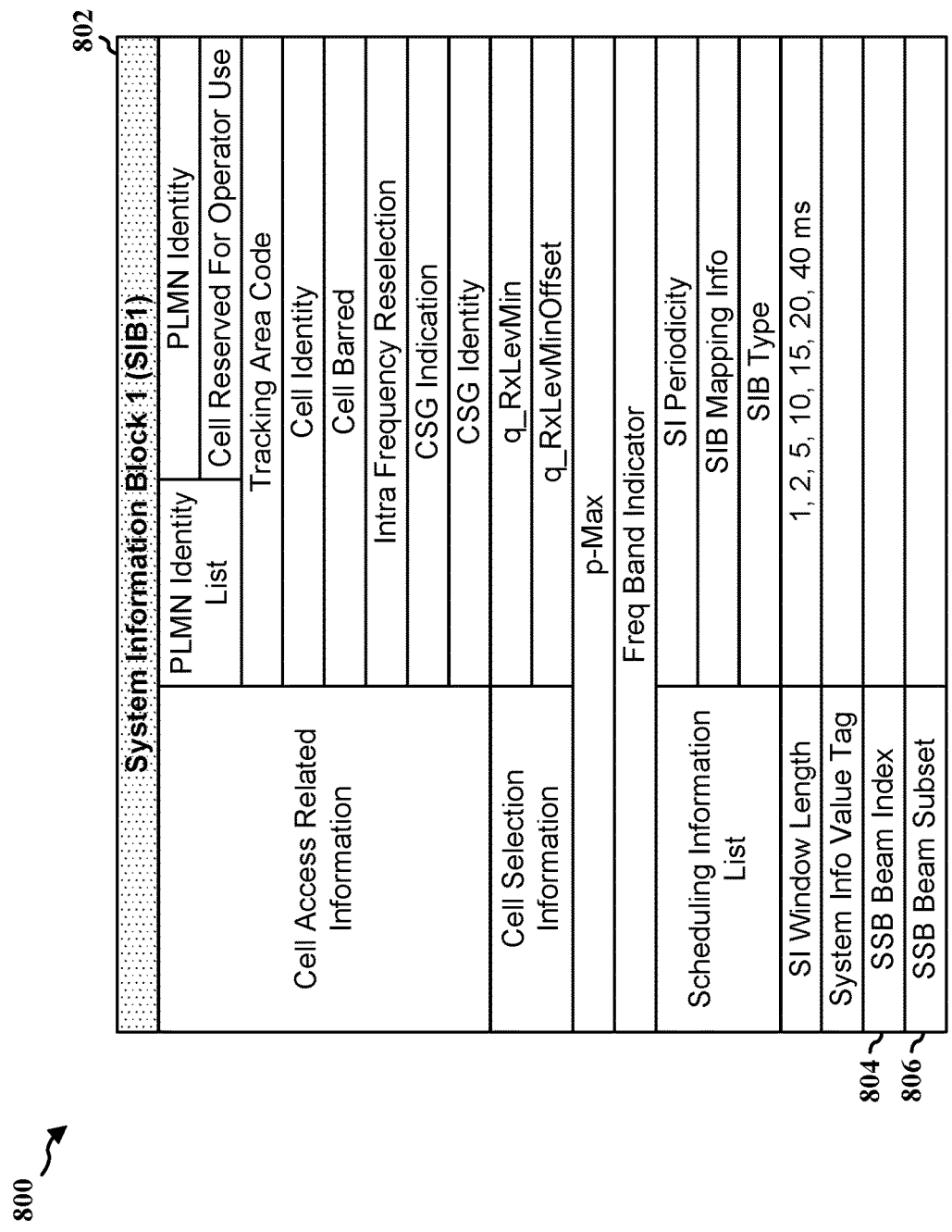
FIG. 8 is a diagram illustrating an example of system information block in accordance with various aspects of the present disclosure.

FIG. 8 is a diagram 800 illustrating an example of an RMSI 802 (e.g., SIB1) information elements (e.g., carried information). The RMSI 802 may include one or more of the following headers and/or parameters: a public land mobile network (PLMN) identity list; PLMN identity, a cell reserved for operator use, a tracking area code, a cell identity, a cell barred, an intra frequency reselection, a CSG indication, a CSG identity, q_RxLevMin, q_RxLevMinOffset, p-Max, a frequency band indicator and an SI periodicity, SIB mapping information, an SIB type, an SI window length and a system information value tag, etc.

The PLMN identity list parameter may identify multiple PLMNs (e.g., up to six (6) PLMNs) in the list, where the first one in the list may be a primary PLMN. The PLMN identity parameter may identify an operator's global identity, which may be a combination of the Mobile Country Codes (MCCs) and the Mobile Network Codes (MNCs). The cell reserved for operator use parameter may indicate that the cell (e.g., base station) is reserved or not reserved for the operator. If there are multiple PLMNs indicated in the RMSI 802 (e.g., SIB1), this field may be specified per PLMN inverse of the cell barred parameter. The tracking area code parameter may identify a tracking area for paging the users. The cell identity parameter may identify a cell within the PLMN. The cell barred parameter may identify the cell access status. If the cell barred parameter indicates the cell is barred, then it may not allow the user to access to the cell. When multiple PLMNs are listed in the RMSI 802, this field may be common for all PLMNs. The intra frequency reselection parameter may identify the intra-frequency reselection permission status (e.g., whether it is allowed or not). The CSG Indication parameter may identify whether there is a Closed Subscriber Group (CSG) (e.g., true or false). The CSG identity may identify a limited set of users with connectivity access. If the CSG indication parameter indicates there is a CSG (e.g., true), those UEs within the group may access the CSG cell. The q_RxLevMin parameter may indicate a minimum received reference signal received power (RSRP) level for cell selection. The q_RxLevMinOffset parameter may indicate an offset to the minimum signal level. The p-Max parameter may define the maximum allowed uplink transmit power for the UE. The frequency band indicator may indicate a base station or a network frequency band. The SI periodicity parameter may indicate the periodicity of SIBs (e.g., other than SIB1). The SIB mapping information parameter may identify a list of mapped SIBs. The SIB type parameter may identify the type of transmitted SIB message in the list. The SI window length parameter may define a window to enable multiple transmissions of the SI message within the window. The SI window length may be set to a certain time period, e.g., 1, 2, 5 10, 15, 20 or 40 ms. The system information value tag parameter may be used by the UE to verify whether the previously stored SI messages are still valid when a change has occurred in the SI message(s).

In one example, as shown by FIG. 8, an extra or additional header (e.g., information element or beam-specified field) may be included or defined in the RMSI 802 (e.g., SIB1) to indicate a corresponding SSB beam index 804, where a UE may determine or select one or more SSB beams that is strongest or better for receiving the SSB based on the SSB beam index 804 (e.g., one or more SSB beams that are stronger than other beams and/or above a threshold). For example, the header for the SSB beam index 804 may use a 5-bit header for some bitfield in the RMSI 802 to indicate the corresponding SSB beam index 804 within a total number of SSB beams (e.g., 32 beams), where the SSB beam index 804 may indicate one or more SSB beams for which the beam-specific system information applies.

Alternatively, or additionally, an extra or additional header may be included or defined in the RMSI 802 to indicate a corresponding SSB beam subset 806, where a UE may determine or select a subset of SSB beams based on the SSB beam subset 806 for receiving the SSB. In other words, the SSB beam subset 806 may indicate one or more SSB beams for which the beam-specific system information applies. For example, the header for the SSB beam subset 806 may use a 2-bit header for some bitfield in the RMSI 802 to indicate the corresponding SSB beam subset 806, such as corresponding to the two most significant bits of the SSB beam index, etc. In another example, the header for the SSB beam subset 806 may use or may be a 1-bit header for some bitfield in the RMSI 802 to indicate whether the corresponding SSB beam is for the first half or second half of the SSB beams. As discussed in connection with FIG. 6, this may correspond to the upper and lower angles/subsets of SSB beams (e.g., beams 606 and 608) for a two-dimensional beamforming by the base station.

Figure 9:
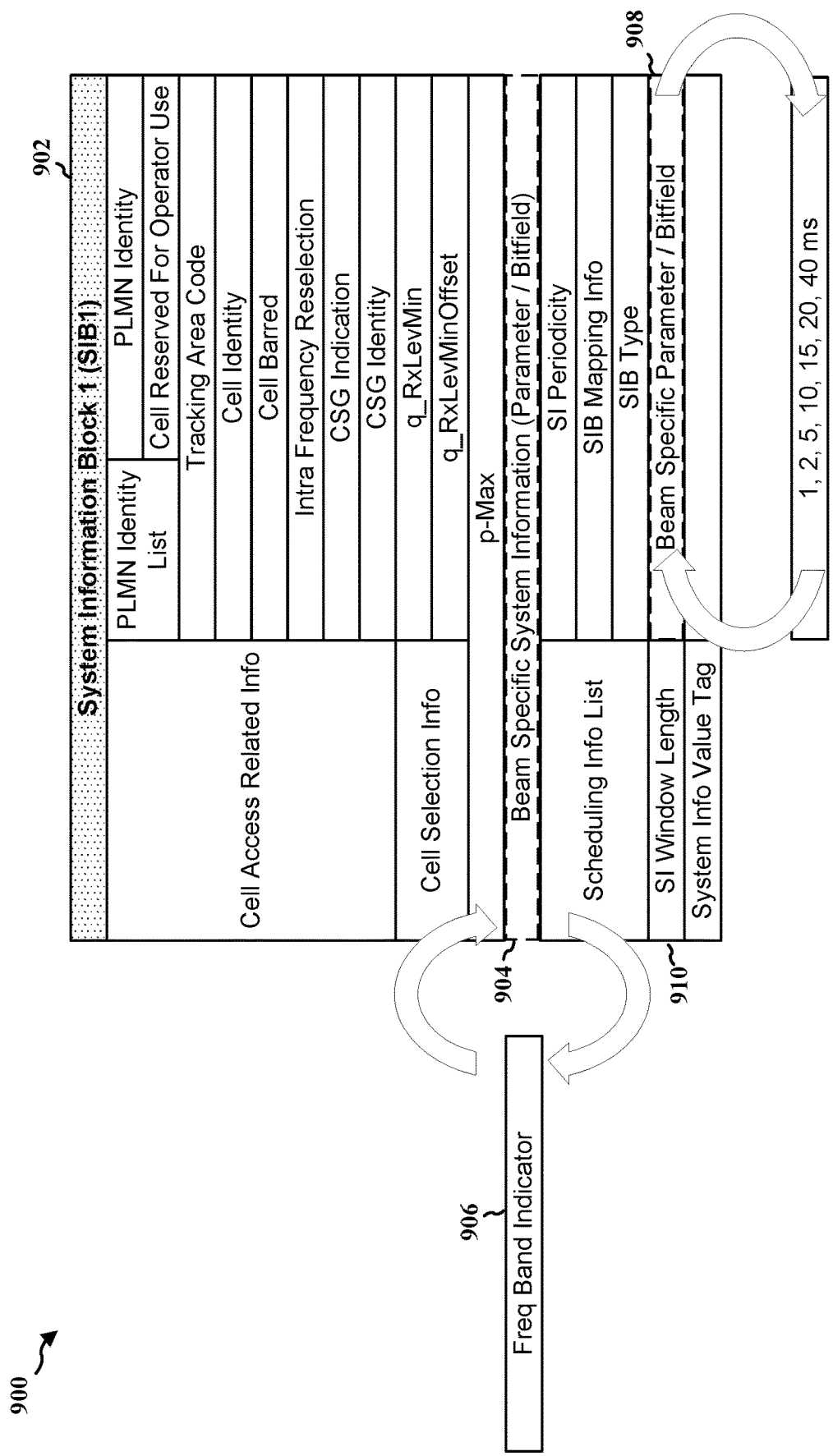
FIG. 9 is a diagram illustrating an example of system information block in accordance with various aspects of the present disclosure.

In one aspect, as shown by diagram 900 of FIG. 9, the beam-specific bitfield 904 or 908 (e.g., the bitfield for SSB beam index 804, SSB beam subset 806, etc.) indicated by an associated header in the RMSI 902 may override another part (e.g., general bitfield, information element, header, etc.) of the RMSI 902. In other words, instead of adding the beam-specific bitfield 904 or 908 as an extra or additional header and/or bitfield into the RMSI 902, the beam-specific bitfield 904 may override another bitfield and/or header in the RMSI 902. For example, the beam-specific bitfield 904 or 908 may override the general bitfield (for all UEs) of a frequency band indicator parameter 906 and/or an SI window length parameter 910 with the beam-specific system information parameter. In another example, a random access response (RAR) window length for a specific SSB beam may be indicated in the beam-specific bitfield (e.g., 904, 908) which may override a regular RAR window length that may be used to indicated for all SSB beams, etc. In other examples, other parameters associated with the RACH procedure, such as the number of repetitions, may also be overridden by the beam-specific bitfield (e.g., 904, 908). The beam-specific bitfield may override any bitfield(s) or header(s) in the RMSI, such as the bitfields or the headers described in connection with FIGS. 4 and 8 (e.g., SI windows length, random access parameters, information regarding the availability and scheduling of other SIBs, parameters related to RACH procedures, etc.).

After a UE receives the RMSI (e.g., 802, 902) containing the beam-specific system information (e.g., 804, 806, 904, 908) from a base station, the UE may receive/monitor one or more SSBs from the base station based on the received RMSI indicating the beam-specific system information, such as by configuring its receiving beam(s) based on the beam-specific system information or applying configuration indicated in the beam-specific system information.

Figure 10:
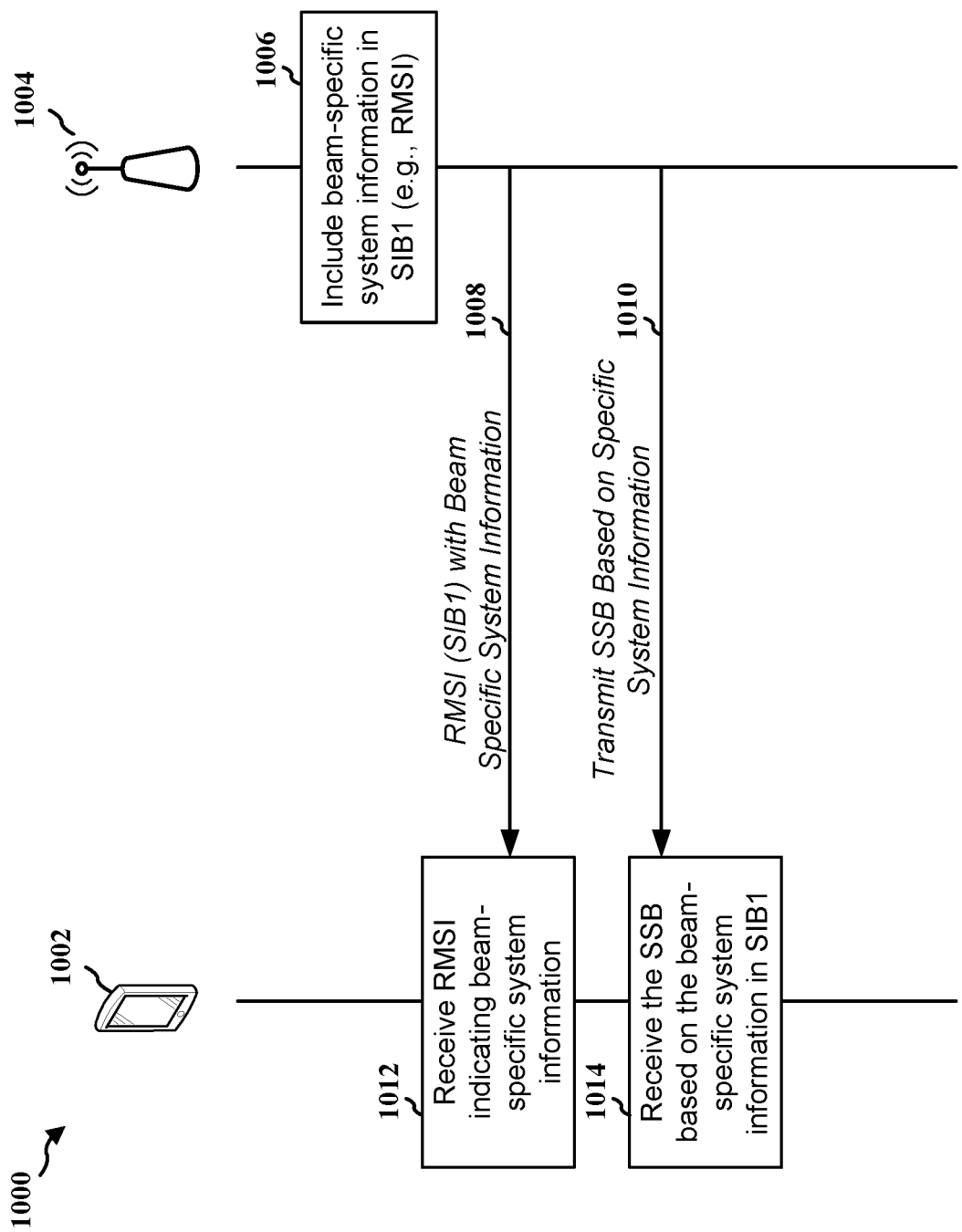
FIG. 10 is a communication flow illustrating an example of transmitting and applying beam-specific system information in accordance with various aspects of the present disclosure.

FIG. 10 is a communication flow 1000 illustrating an example of transmitting the beam-specific system information from a base station 1004 and applying the beam-specific system information at a UE 1002. At 1006, the base station 1004 may include beam-specific system information in the RMSI (e.g., SIB1), where the RMSI may be associated with one or more SSB beams for receiving an SSB, such as described in connection with FIGS. 8 and 9. At 1008, the base station 1004 may transmit (e.g., broadcast) the RMSI to the UE 1002. At 1010, the base station 1004 may transmit (e.g., broadcast) the SSB to the UE 1002 based on the transmitted RMSI indicating the beam-specific system information. For example, the base station 1004 may transmit the SSB using SSB beam(s) indicated in the RMSI. At 1012, the UE 1002 may receive, from the base station 1004, RMSI indicating beam-specific system information in association with one or more synchronization signal block (SSB) beams for receiving an SSB. At 1014, the UE 1002 may receive the SSB from the base station 1004 based on the received RMSI indicating the beam-specific system information. For example, based on the beam-specific system information in the RMSI, the UE may tune its receiving beams and/or apply the setting(s) or parameter(s) within the beam-specific system information to receive the SSB.

To enable a backward compatibility for a UE that may not be able to read or decode the extra beam-specific system information in the RMSI, in overriding the one or more parameters (e.g., general bitfields) of the RMSI (e.g., 802, 902), the beam-specific bitfield (e.g., 804, 806, 808, 904, 908, etc.) may be configured to be compatible with the bitfield (e.g., general bitfield) that it overrides. For example, if the beam-specific bitfield indicates multiple repetitions for some part of a RACH procedure, one copy over resources indicated in the corresponding general bitfield may be included among the repetitions. Thus, UEs that are not configured or unable to interpret the new beam-specific bitfield in the RMSI may still be able to decode the RMSI or other information within the RMSI. In another example, referring back to FIG. 9, if the general bitfield for the SI Window Length 910 parameter supports a certain window length, e.g., 1, 2, 5, 10, 15, 20 or 40 ms window length, the beam-specific bitfield may also select a value among the window length supported. Although the UE may still be able to read or decode the RMSI or other information (e.g., parameter, bitfield) within the RMSI, the UE may operate under a suboptimal condition by using or applying the parameters or settings in the RMSI having the beam-specific system information.

Figure 11:
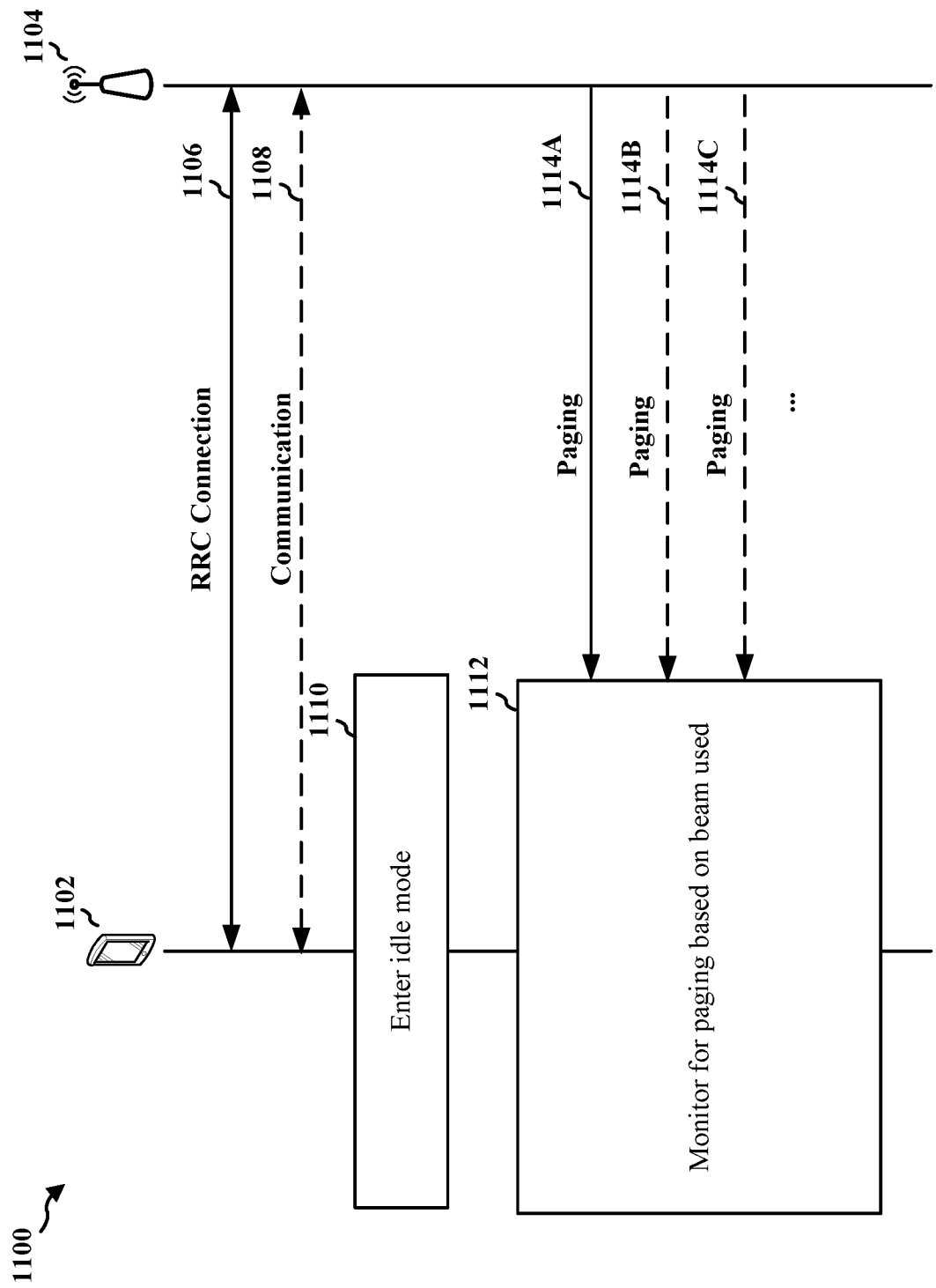
FIG. 11 illustrates example communication between a base station and a UE in accordance with various aspects of the present disclosure.

In other aspects of the present disclosure, methods, apparatuses, and computer program products are provided for beam specific coverage enhancement for paging. FIG. 11 illustrates an example of communication 1100 between a base station 1104 and a UE 1102. The base station 1104 may correspond to, e.g., the base station 102, 180, 310, or the like. The UE 1102 may correspond to, e.g., the UE 104, 350, or the like. The communication between the base station 1104 and the UE 1102 may include beamformed communication, as described in connection with FIG. 7. One or more of the illustrated operations may be omitted, transposed, or contemporaneous.

The ULE 1102 may establish an RRC connection 1106 with the base station 1104. The UE 1102 may establish the RRC connection 1106 with the base station 1104 in a RACH process. For example, the UE 1102 may establish the RRC connection by transmitting a message (Msg) 1 preamble, receiving a Msg 2 RACH response, transmitting a Msg 3 PUSCH, and then receiving a Msg 4 PDCCH/PDSCH.

After establishing the RRC connection, the UE 1102 may transmit and receive communication 1108 with the base station 1104. The communication may include user data or other data, control signaling, etc. In some aspects, the base station 1104 may transmit an indication of one or more parameters for paging based on a particular beam, or subset of beams. The base station 1104 may provide the information about the beam specific parameter(s) for paging in remaining minimum system information (RMSI) or other system information (OSI). In some examples, the RMSI or OSI including the beam specific parameters for paging may be transmitted on the beam to which the parameters apply.

The beam specific parameter(s) may indicate a coverage enhancement for paging on one or more beams. For example, the base station may indicate paging repetition, or increased paging repetition for pages transmitted on a particular beam, or a subset of beams. The base station may indicate one or more added monitoring occasions for pages using the beam, or the subset of beams.

In some aspects, the corresponding RMSI or the OSI may include an indication of monitoring aggregation for a paging downlink control information (DCI) or a paging message for the beam.

At 1110, the UE 1102 may enter an idle mode. The idle mode may be entered for power-saving purpose. The idle mode may be an RRC idle mode, an RRC inactive mode, a mode that includes discontinuous reception (DRX), etc. In some aspects, in the idle mode, the UE may not transmit uplink or receive downlink user data. In idle mode, the UE 1102 may monitor for system information broadcast by the base station 1104, select a PLMN, monitor for paging, or the like.

When the UE 1102 is in idle mode or reduced power mode, the UE 1102 may monitor for paging 1114A, 1114B, 1114C, and subsequent paging using paging parameters based on the beam being monitored, at 1112. The paging may be transmitted by the base station 1104 using periodic paging resources. The UE 1102 may be RRC inactive when not monitoring for paging and may periodically monitor paging. The paging monitoring may follow a SSB-beam-specific procedure as indicated by the corresponding RMSI or OSI. Beam-specific repetition may be applied for paging DCI and/or paging message. The UE may monitor for pages and repetitions of pages when monitoring for pages from the particular beam. Beam-specific added monitoring occasions may be indicated for paging, by the corresponding RMSI or OSI. The UE may monitor the additional paging occasions if the UE is monitoring for pages on the particular beam. Beam-specific monitoring aggregation may be indicated for paging DCI and/or paging message, by the corresponding RMSI or OSI. The UE may apply the aggregation if the UE is monitoring for pages on the particular beam.

Figure 12:
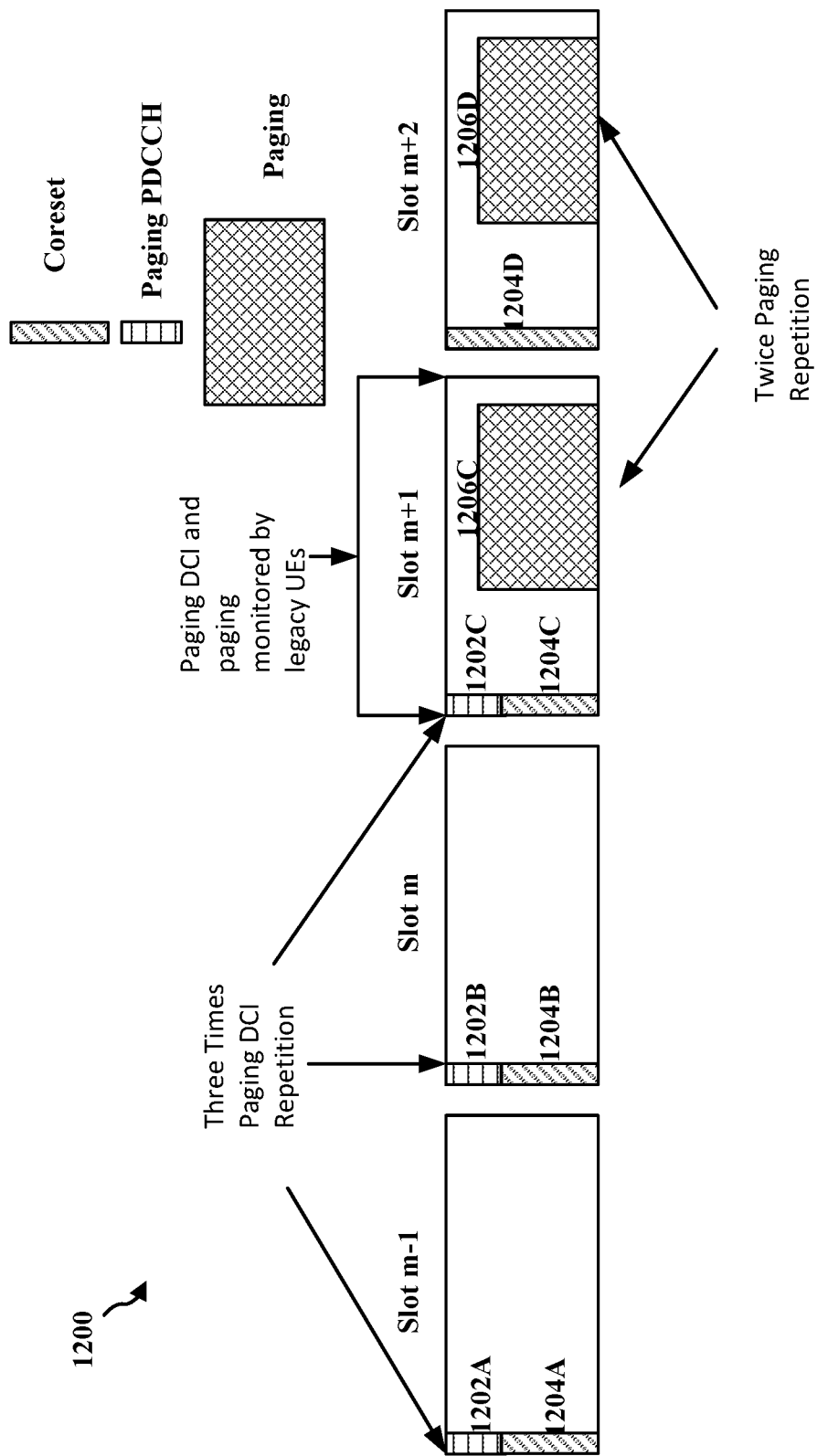
FIG. 12 illustrates example monitoring occasions for paging in accordance with various aspects of the present disclosure.

In some aspects, the RMSI or the OSI may include an indication of one or more repetitions for paging DCI or a paging message in a beam-specific field. The one or more repetitions may include a copy of both the paging DCI and the paging message in a monitoring occasion of one or more monitoring occasions that can be received by a UE with an earlier capability. The copy of both the paging DCI and the paging message in one monitoring occasion may be read by a legacy UE or an earlier capability UE (UEs without a capability for monitoring for paging based on a paging configuration for the beam) and hence provide backward compatibility. FIG. 12 illustrates example monitoring occasions 1200. As illustrated in FIG. 12, four monitoring occasions at slot m−1, slot m, slot m+1, and slot m+2 may be present. The monitoring occasion at slot m−1 includes a paging PDCCH (that may include paging DCI) 1202A and CORESET 1204A. The monitoring occasion at slot m may include a paging PDCCH (that may include paging DCI) 1202B and CORESET 1204B. The monitoring occasion at slot m+1 may include a paging PDCCH (that may include paging DCI) 1202C, CORESET 1204C, and paging message 1206C. Therefore, the monitoring occasion at slot m+1 may include a copy of both the paging DCI and the paging message in one monitoring occasion and may be read by a legacy UE or an earlier capability UE. The monitoring occasion at slot m+2 includes a CORESET 1204D and a paging message 1206D. Among the four monitoring occasions, paging DCI included in paging PDCCH is repeated three times and paging message is repeated twice.

Figure 13:
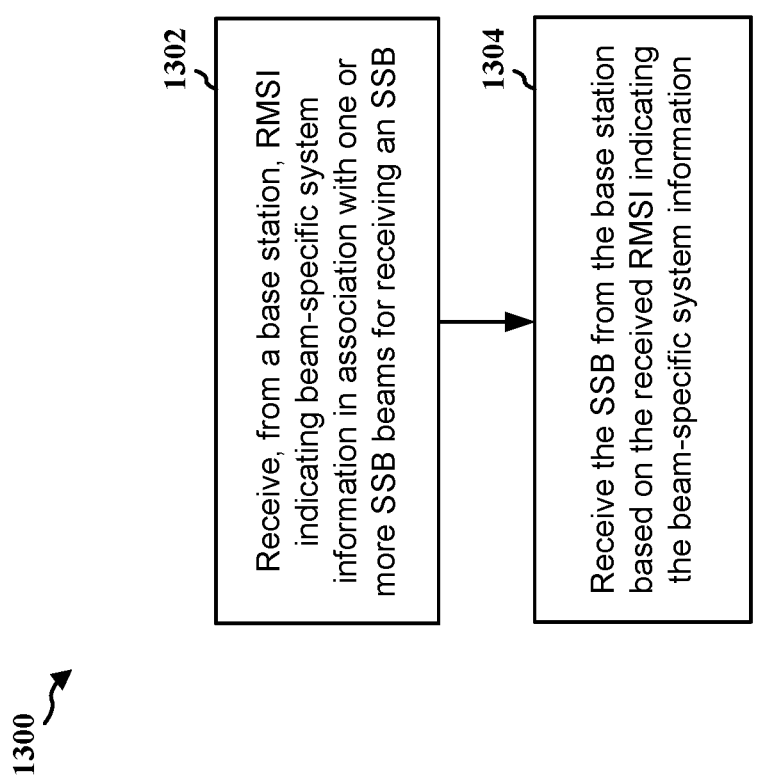
FIG. 13 is a flowchart of a method of wireless communication.

FIG. 13 is a flowchart 1300 of a method of wireless communication. The method may be performed by a UE or a component of a UE (e.g., the UE 104, 350, 402, 502, 702, 1002; the apparatus 1402; a processing system, which may include the memory 360 and which may be the entire UE 350 or a component of the UE 350, such as the TX processor 368, the RX processor 356, and/or the controller/processor 359). The method may enable the UE to receive the SSB from the base station based on the beam-specific system information in a received RMSI, where the beam-specific system information may be associated with one or more SSB beams.

At 1302, the UE may receive, from a base station, RMSI indicating beam-specific system information in association with one or more SSB beams for receiving an SSB, such as described in connection with FIGS. 4, 8, 9 and 10. For example, as shown by FIG. 10, the UE 1002 may receive RMSI (e.g., SIB1) from the base station 1004 at 1008. The base station 1004 may include the beam-specification system information in the RMSI at 1006, and may transmit the RMSI to the UE 1002 at 1008. The reception of the RMSI may be performed by, e.g., the RMSI process component 1440 and/or the reception component 1430 of the apparatus 1402 in FIG. 14.

In one example, the RMSI may include a header indicating the one or more SSB beams for which the beam-specific system information applies, such as described in connection with FIGS. 8 and 9. For example, the RMSI 802, 902 may include beam-specific header and/or bitfield (e.g., 804, 806, 904, 908).

In another example, the header may indicate the one or more SSB beams through an SSB beam index for each of the one or more SSB beams or through an indication of an SSB beam subset of a set of SSB beams. As shown by FIGS. 8 and 9, the RMSI may indicate other information (e.g., other parameters in SIB1) associated with the one or more SSB beams for receiving the SSB, and the received beam-specific system information may override the other information. In another example, the RMSI may be received in an SIB1.

At 1304, the UE may receive the SSB from the base station based on the received RMSI indicating the beam-specific system information, such as described in connection with FIG. 10. For example, the base station 1004 may transmit the SSB to the UE 1002 at 1010, and the UE 1002 may receive the SSB from the base station 1004 based on the beam-specific system information at 1016. The reception of the SSB may be performed by, e.g., the SSB process component 1442 and/or the reception component 1430 of the apparatus 1402 in FIG. 14.

Figure 14:
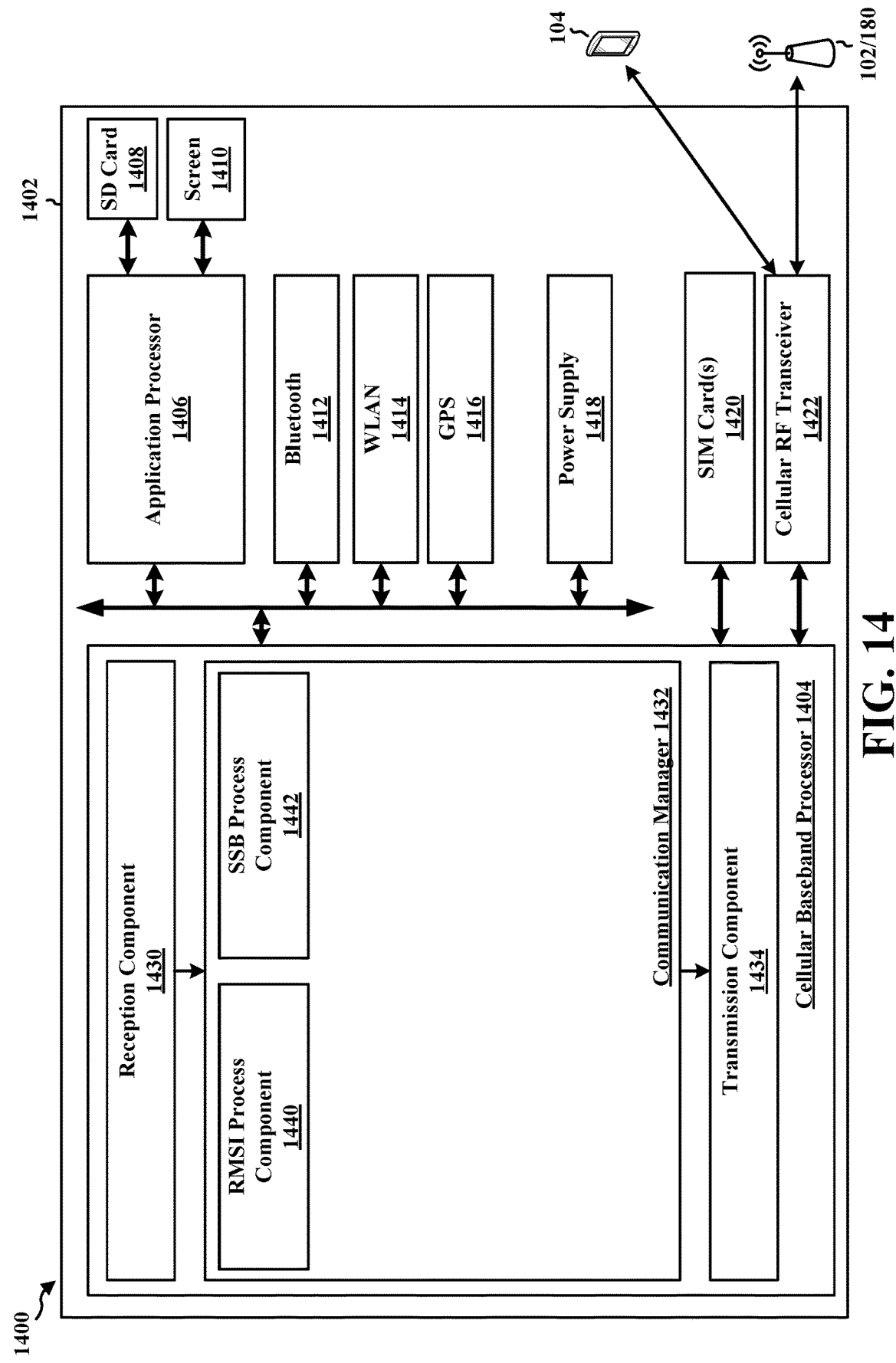
FIG. 14 is a diagram illustrating an example of a hardware implementation for an example apparatus.

FIG. 14 is a diagram 1400 illustrating an example of a hardware implementation for an apparatus 1402. The apparatus 1402 is a UE and includes a cellular baseband processor 1404 (also referred to as a modem) coupled to a cellular RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the aforediscussed additional modules of the apparatus 1402.

The communication manager 1432 includes an RMSI process component 1440 that is configured to receive, from a base station, RMSI indicating beam-specific system information in association with one or more SSB beams for receiving an SSB, e.g., as described in connection with 1302 of FIG. 13. The communication manager 1432 further includes an SSB process component 1442 that is configured to receive the SSB from the base station based on the received RMSI indicating the beam-specific system information, e.g., as described in connection with 1304 of FIG. 13.

The apparatus may include additional components that perform each of the blocks of the algorithm in the flowchart of FIG. 13. As such, each block in the flowcharts of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the cellular baseband processor 1404, includes means for receiving, from a base station, RMSI indicating beam-specific system information in association with one or more SSB beams for receiving an SSB (e.g., the RMSI process component 1440 and/or the reception component 1430). The apparatus 1402 includes means for receiving the SSB from the base station based on the received RMSI indicating the beam-specific system information (e.g., the SSB process component 1442 and/or the reception component 1430).

In one configuration, the RMSI includes a header indicating the one or more SSB beams for which the beam-specific system information applies. In such configuration, the header indicates the one or more SSB beams through an SSB beam index for each of the one or more SSB beams, and/or the header indicates the one or more SSB beams through an indication of an SSB beam subset of a set of SSB beams.

In another configuration, the RMSI indicates other information associated with the one or more SSB beams for receiving the SSB, and the received beam-specific system information overrides the other information. In another configuration, the RMSI is received in an SIB1.

The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 15:
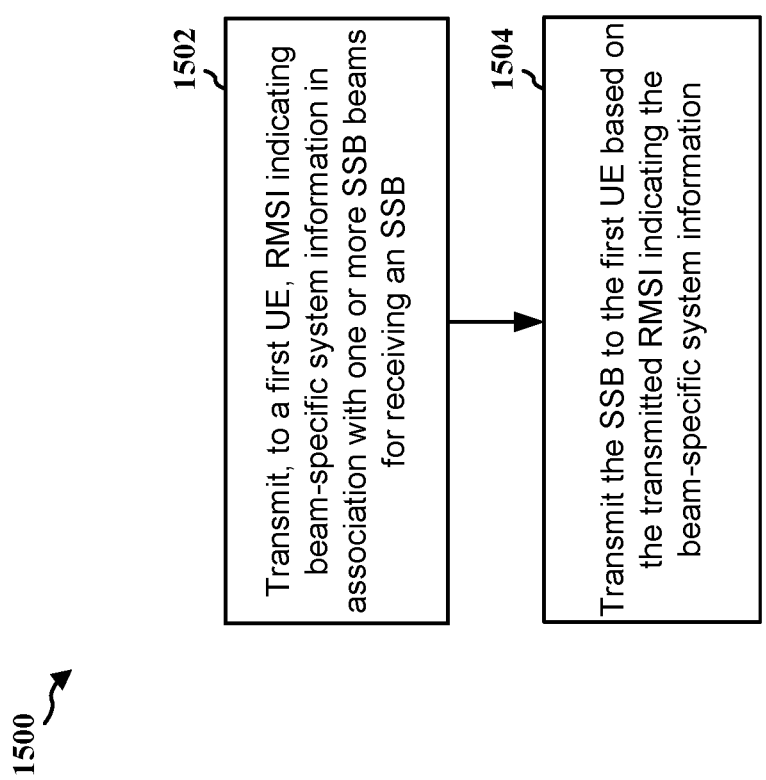
FIG. 15 is a flowchart of a method of wireless communication.

FIG. 15 is a flowchart 1500 of a method of wireless communication. The method may be performed by a base station or a component of a base station (e.g., base station 102, 180, 310, 504, 604, 704, 1004; which may include the memory 376 and which may be the entire base station 310 or a component of the base station 310, such as the TX processor 316, the RX processor 370, and/or the controller/processor 375). The method may enable the base station to include beam-specific system information in the RMSI, where the beam-specific system information may be associated with one or more SSB beams. The base station may then transmit the SSB based on the beam-specific system information indicated in the RMSI.

At 1502, the base station may transmit, to a first UE, RMSI indicating beam-specific system information in association with one or more SSB beams for receiving an SSB, such as described in connection with FIGS. 4, 8, 9, and 10. For example, as shown by FIG. 10, the base station 1004 may include the beam-specification system information in the RMSI at 1006, and may transmit the RMSI to the UE 1002 at 1008. The transmission of the RMSI may be performed by, e.g., the RMSI configuration component 1640 and/or the transmission component 1634 of the apparatus 1602 in FIG. 16.

In one example, the RMSI may include a header indicating the one or more SSB beams for which the beam-specific system information applies, such as described in connection with FIGS. 8 and 9. For example, the RMSI 802, 902 may include beam-specific header and/or bitfield (e.g., 804, 806, 904, 908). In such an example, the header may indicate the one or more SSB beams through an SSB beam index for each of the one or more SSB beams or through an indication of an SSB beam subset of a set of SSB beams. As shown by FIGS. 8 and 9, the RMSI may indicate other information (e.g., other parameters or general bitfield in SIB1) associated with the one or more SSB beams for receiving the SSB, and the received beam-specific system information may override the other information.

In another example, the RMSI may also be transmitted to a second UE (e.g., UE that is unable to read or decode the beam-specific system information) where the other information may be for the second UE, and the transmitted beam-specific system information may be for the first UE. In such an example, the transmitted beam-specific system information may be compatible with the other information such that the parameter within the beam-specific system information may still be applied to or decoded by the second UE. However, the second UE may operate under a suboptimal setting by using the beam-specific system information.

At 1504, the base station may transmit the SSB to the first UE based on the transmitted RMSI indicating the beam-specific system information, such as described in connection with FIG. 10. For example, the base station 1004 may transmit the SSB to the UE 1002 at 1010 based on the beam-specific system information indicated in the RMSI. The transmission of the SSB may be performed by, e.g., the SSB configuration component 1642 and/or the transmission component 1634 of the apparatus 1602 in FIG. 16.

Figure 16:
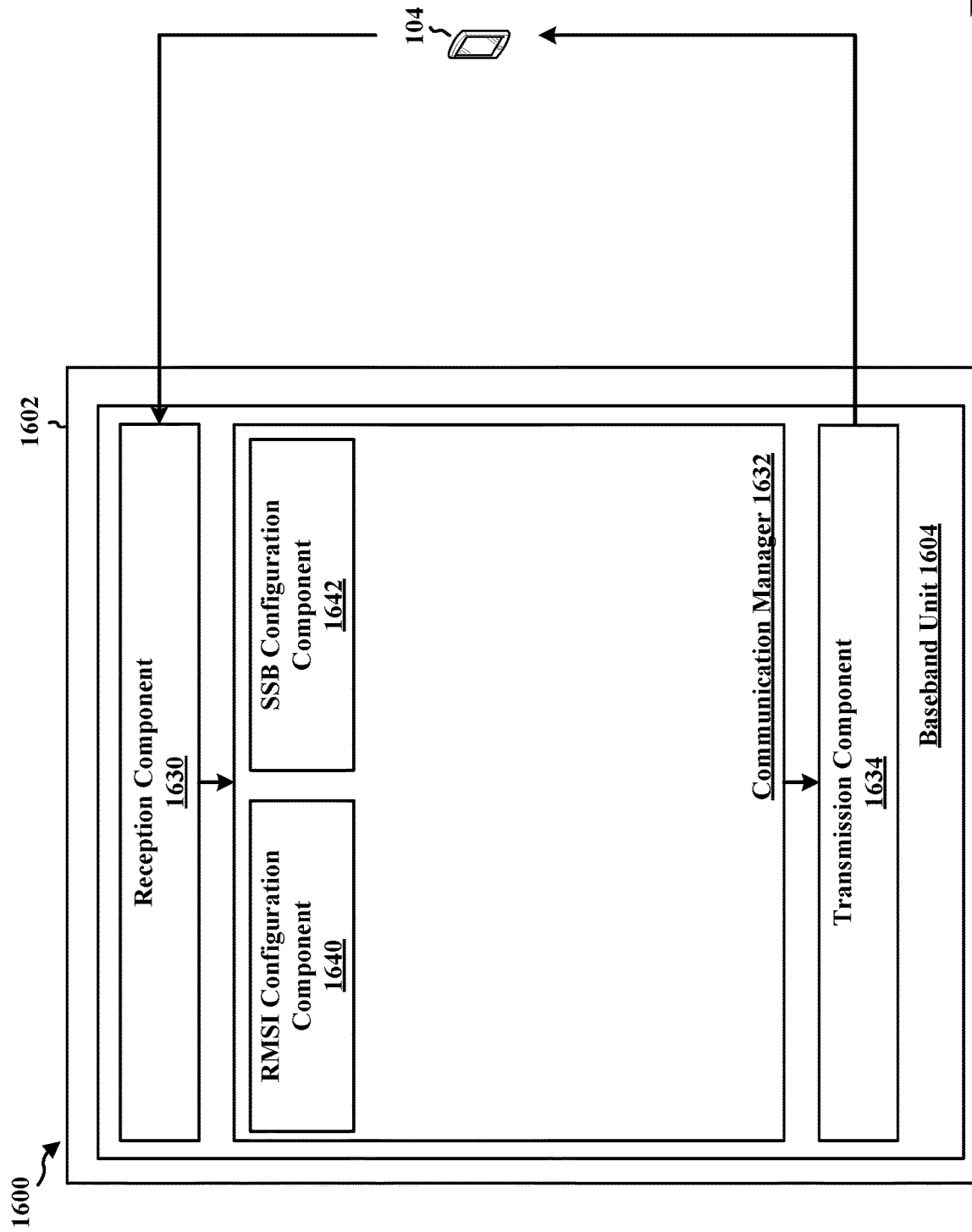
FIG. 16 is a diagram illustrating an example of a hardware implementation for an example apparatus.

FIG. 16 is a diagram 1600 illustrating an example of a hardware implementation for an apparatus 1602. The apparatus 1602 is a base station and includes a baseband processor 1604. The baseband processor 1604 may communicate through a cellular RF transceiver with the UE 104. The baseband processor 1604 may include a computer-readable medium/memory. The baseband processor 1604 is responsible for general processing, including the execution of software stored on the computer-readable medium/memory. The software, when executed by the baseband processor 1604, causes the baseband processor 1604 to perform the various functions described supra. The computer-readable medium/memory may also be used for storing data that is manipulated by the baseband processor 1604 when executing software. The baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband processor 1604. The baseband processor 1604 may be a component of the BS 310 and may include the memory 376 and/or at least one of the TX processor 316, the RX processor 370, and the controller/processor 375.

The communication manager 1632 includes an RMSI configuration component 1640 that is configured to transmit, to a first UE, RMSI indicating beam-specific system information in association with one or more SSB beams for receiving an SSB, e.g., as described in connection with 1502 of FIG. 15. The communication manager 1632 further includes an SSB configuration component 1642 that is configured to transmit the SSB to the first UE based on the transmitted RMSI indicating the beam-specific system information, e.g., as described in connection with 1504 of FIG. 15.

The apparatus may include additional components that perform each of the blocks of the algorithm in the flowchart of FIG. 15. As such, each block in the flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the baseband processor 1604, includes means for transmitting, to a first UE, RMSI indicating beam-specific system information in association with one or more SSB beams for receiving an SSB (e.g., the RMSI configuration component 1640 and/or the transmission component 1634). The apparatus 1602 includes means for transmitting the SSB to the first UE based on the transmitted RMSI indicating the beam-specific system information (e.g., the SSB configuration component 1642 and/or the transmission component 1634).

In one configuration, the RMSI includes a header indicating the one or more SSB beams for which the beam-specific system information applies. In such configuration, the header indicates the one or more SSB beams through an SSB beam index for each of the one or more SSB beams, and/or the header indicates the one or more SSB beams through an indication of an SSB beam subset of a set of SSB beams.

In one configuration, the RMSI indicates other information associated with the one or more SSB beams for receiving the SSB, and the received beam-specific system information overrides the other information. In such configuration, the RMSI may also be transmitted to a second UE where the other information is for the second UE, and the transmitted beam-specific system information is for the first UE. In such configuration, the transmitted beam-specific system information is compatible with the other information.

The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

Aspects of the present disclosure may enable the base station to apply coverage enhancement for one or more SSB beam(s) or a subset of SSB beams for broadcasting system information in a more efficient manner.

Figure 17:
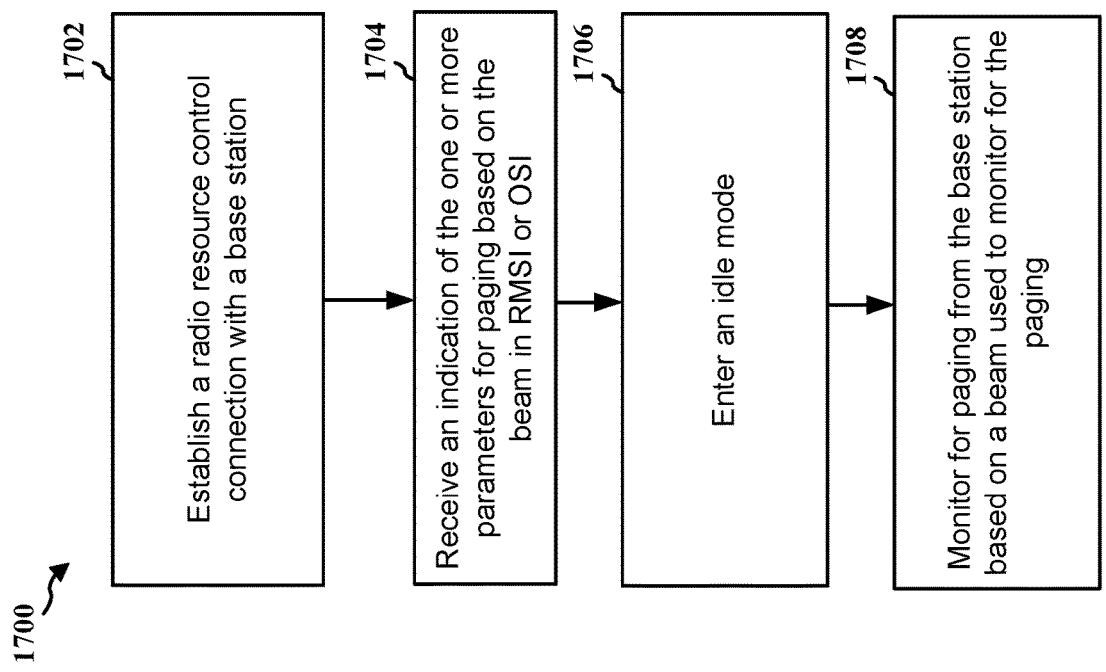
FIG. 17 is a flowchart of a method of wireless communication.

FIG. 17 is a flowchart 1700 of a method of wireless communication. The method may be performed by a UE (e.g., the UE 104, 1102, and the apparatus 1802). The method may enable the UE to more accurately receive pages from a base station based on the unique characteristics of a particular beam.

At 1702, the UE establishes a radio resource control connection with a base station. For example, connection 1702 may be performed by RRC connection component 1842 in FIG. 18. In some aspects, the UE may establish an RRC connection with the base station in a RACH procedure. For example, the UE may establish an RRC connection with the UE by transmitting a Msg 1 preamble, receiving a Msg 2 RACH response, transmitting a Msg 3 PUSCH, and then receiving a Msg 4 PDCCH/PDSCH.

In some aspects, at 1704, the UE receives, from the base station, an indication of one or more parameters for paging based on the beam in RMSI or OSI. For example, reception 1704 may be performed by indication reception component 1844 in FIG. 18. In some aspects, the RMSI or the OSI includes an indication of at least one additional monitoring occasion for the paging on the beam. In some aspects, the RMSI or the OSI includes an indication of one or more repetitions for paging DCI or a paging message in a beam-specific field for the paging on the beam. The one or more repetitions includes a copy of the paging DCI and the paging message. In some aspects, the RMSI or the OSI includes an indication of monitoring aggregation for a paging DCI or a paging message for the beam.

At 1706, the UE enters an idle mode. For example, entering idle mode 1706 may be performed by idle mode component 1846 in FIG. 18. The idle mode may be an RRC idle mode. In some aspects, in idle mode, the UE may not transmit uplink or receive downlink user data. In idle mode, the UE may broadcast system information, select a PLMN, monitor for paging, or the like.

At 1708, the UE monitors for paging from the base station based on a beam used to monitor for the paging. For example, monitoring 1708 may be performed by monitoring component 1848 in FIG. 18. In some aspects, the UE monitors for the paging with a first beam using one or more parameters that increase paging coverage relative to a second beam. In some aspects, the paging includes one or more repetitions for paging DCI. In some aspects, the paging includes one or more repetitions for a paging message based on the beam.

Figure 18:
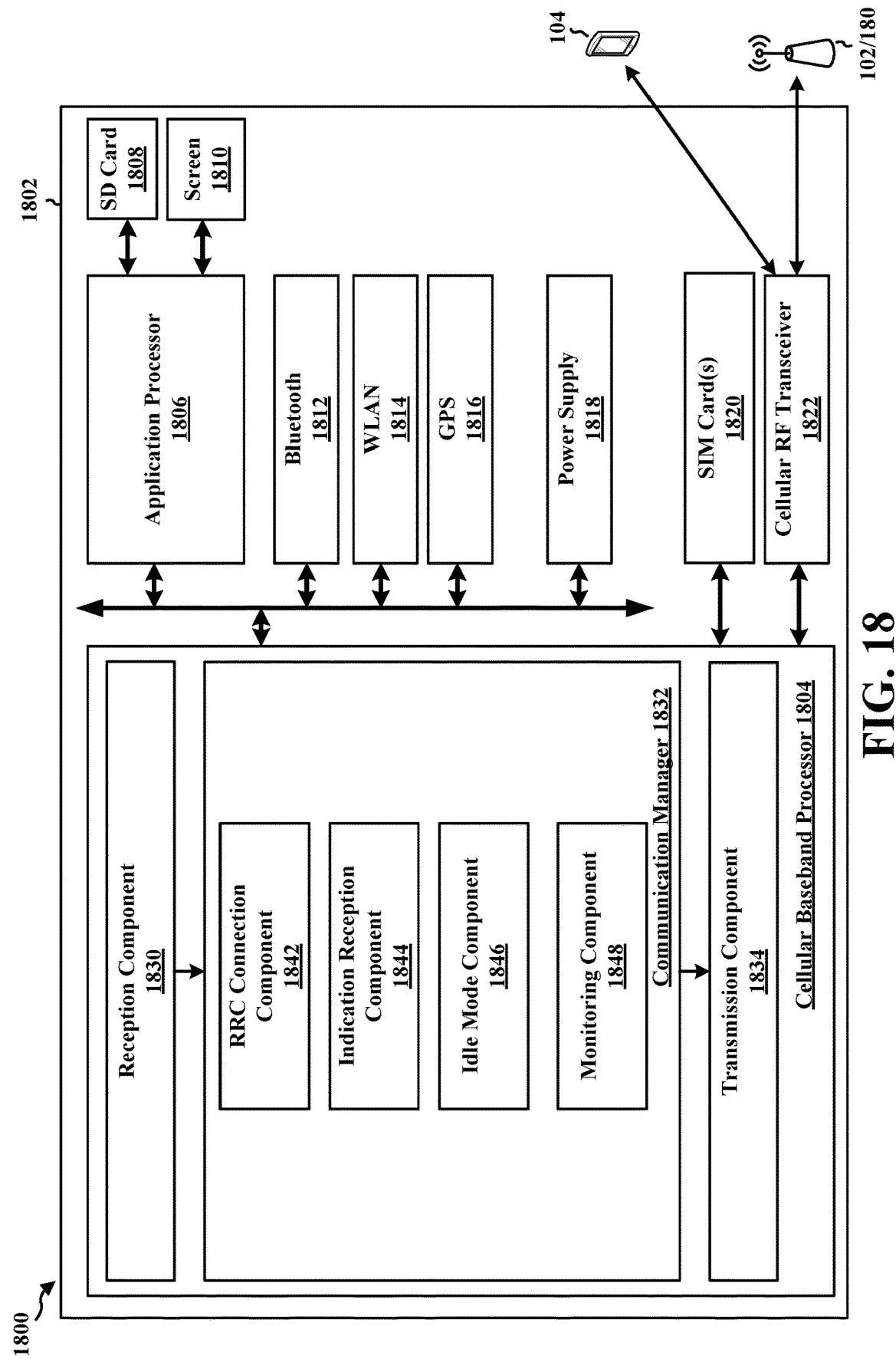
FIG. 18 is a diagram illustrating an example of a hardware implementation for an example apparatus.

FIG. 18 is a diagram 1800 illustrating an example of a hardware implementation for an apparatus 1802. The apparatus 1802 is a UE and includes a cellular baseband processor 1804 (also referred to as a modem) coupled to a cellular RF transceiver 1822 and one or more subscriber identity modules (SIM) cards 1820, an application processor 1806 coupled to a secure digital (SD) card 1808 and a screen 1810, a Bluetooth module 1812, a wireless local area network (WLAN) module 1814, a Global Positioning System (GPS) module 1816, and a power supply 1818. The cellular baseband processor 1804 communicates through the cellular RF transceiver 1822 with the UE 104 and/or BS 102/180. The cellular baseband processor 1804 may include a computer-readable medium/memory. The computer-readable medium/memory may be non-transitory. The cellular baseband processor 1804 is responsible for general processing, including the execution of software stored on the computer-readable medium/memory. The software, when executed by the cellular baseband processor 1804, causes the cellular baseband processor 1804 to perform the various functions described supra. The computer-readable medium/memory may also be used for storing data that is manipulated by the cellular baseband processor 1804 when executing software. The cellular baseband processor 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the cellular baseband processor 1804. The cellular baseband processor 1804 may be a component of the UE 350 and may include the memory 360 and/or at least one of the TX processor 368, the RX processor 356, and the controller/processor 359. In one configuration, the apparatus 1802 may be a modem chip and include just the baseband processor 1804, and in another configuration, the apparatus 1802 may be the entire UE (e.g., see 350 of FIG. 3) and include the aforediscussed additional modules of the apparatus 1802.

The communication manager 1832 includes an RRC connection component 1842 that is configured to establish a radio resource control connection with a base station, e.g., as described in connection with connection 1702 of FIG. 17. The communication manager 1832 further includes an indication reception component 1844 that is configured to receive an indication of the one or more parameters for paging based on the beam in RMSI or OSI, e.g., as described in connection with reception 1704 of FIG. 17. The communication manager 1832 further includes an idle mode component 1846 that is configured to enter an idle mode, e.g., as described in connection with entering the idle mode in 1706 of FIG. 17. The communication manager 1832 further includes a monitoring component 1848 that is configured to monitor for paging from the base station based on a beam used to monitor for the paging, e.g., as described in connection with monitoring 1708 of FIG. 17.

The apparatus may include additional components that perform each of the blocks of the algorithm in the flowchart of FIG. 17. As such, each block in the flowchart of FIG. 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1802, and in particular the cellular baseband processor 1804, includes means for establishing a radio resource control connection with a base station. The cellular baseband processor 1804 further includes means for entering an idle mode. The cellular baseband processor 1804 further includes means for monitoring for paging from the base station based on a beam used to monitor for the paging. In some aspects, the cellular baseband processor further includes means for receiving an indication of the one or more parameters for paging based on the beam in RMSI or OSI. The means may be one or more of the components of the apparatus 1802 configured to perform the functions recited by the means. As described supra, the apparatus 1802 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 19:
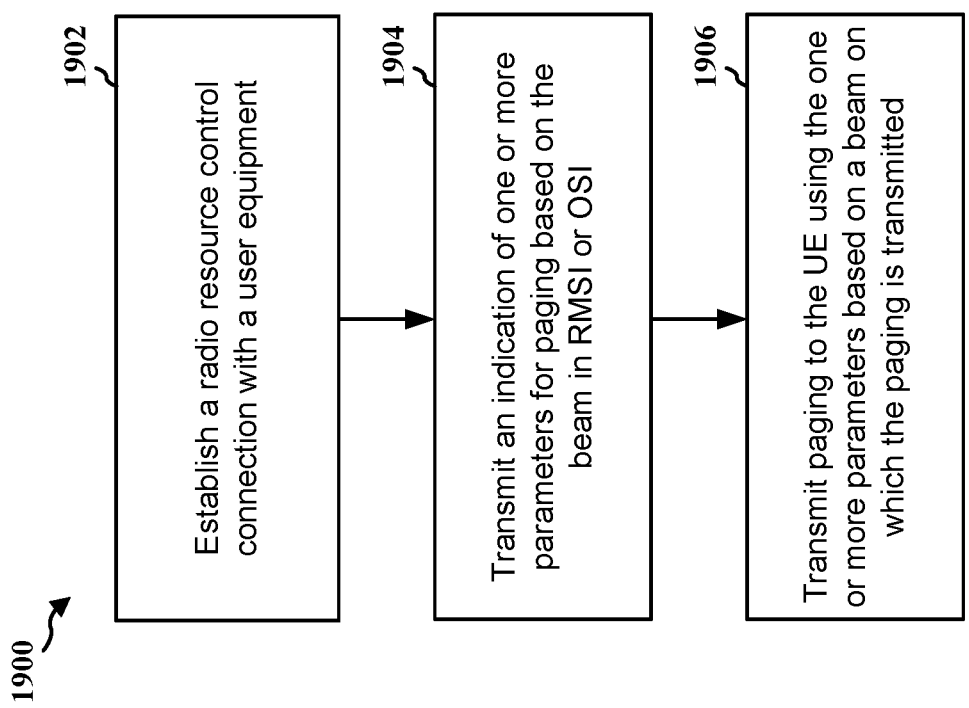
FIG. 19 is a flowchart of a method of wireless communication.

FIG. 19 is a flowchart 1900 of a method of wireless communication. The method may be performed by a base station (e.g., the base station 102, 180, 1104, and the apparatus 2002). The method improves pages from a base station and enables the base station to adjust paging based on the unique characteristics of a particular beam.

At 1902, the base station establishes an RRC connection with a UE. For example, connection 1902 may be performed by RRC connection component 2042 in FIG. 20. In some aspects, the base station may establish an RRC connection with the UE in a RACH procedure. For example, the base station may establish an RRC connection with the UE by receiving a Msg 1 preamble, transmitting a Msg 2 RACH response, receiving a Msg 3 PUSCH, and then transmitting a Msg 4 PDCCH/PDSCH.

In some aspects, at 1904, the base station transmits an indication of one or more parameters for paging based on the beam in RMSI or OSI to the UE. For example, transmission 1904 may be performed by indication transmission component 2044 in FIG. 20. In some aspects, the RMSI or the OSI includes an indication of at least one additional monitoring occasion for the paging on the beam. In some aspects, the RMSI or the OSI includes an indication of one or more repetitions for paging DCI or a paging message in a beam-specific field for the paging on the beam. The one or more repetitions includes a copy of the paging DCI and the paging message. In some aspects, the RMSI or the OSI includes an indication of monitoring aggregation for a paging DCI or a paging message for the beam.

At 1906, the base station transmits paging to the UE using one or more parameters based on a beam on which the paging is transmitted. For example, transmission 1906 may be performed by paging component 2046 in FIG. 20. In some aspects, the one or more parameters for a first beam increase paging coverage relative to the one or more parameters for a second beam. In some aspects, the one or more parameters includes at least one repetition for paging DCI based on the beam on which the paging is transmitted. In some aspects, the one or more parameters includes at least one repetition for a paging message based on the beam on which the paging is transmitted. In some aspects at least one monitoring occasion corresponds to a paging occasion for a UE without a capability for monitoring for paging based on a paging configuration for the beam.

Figure 20:
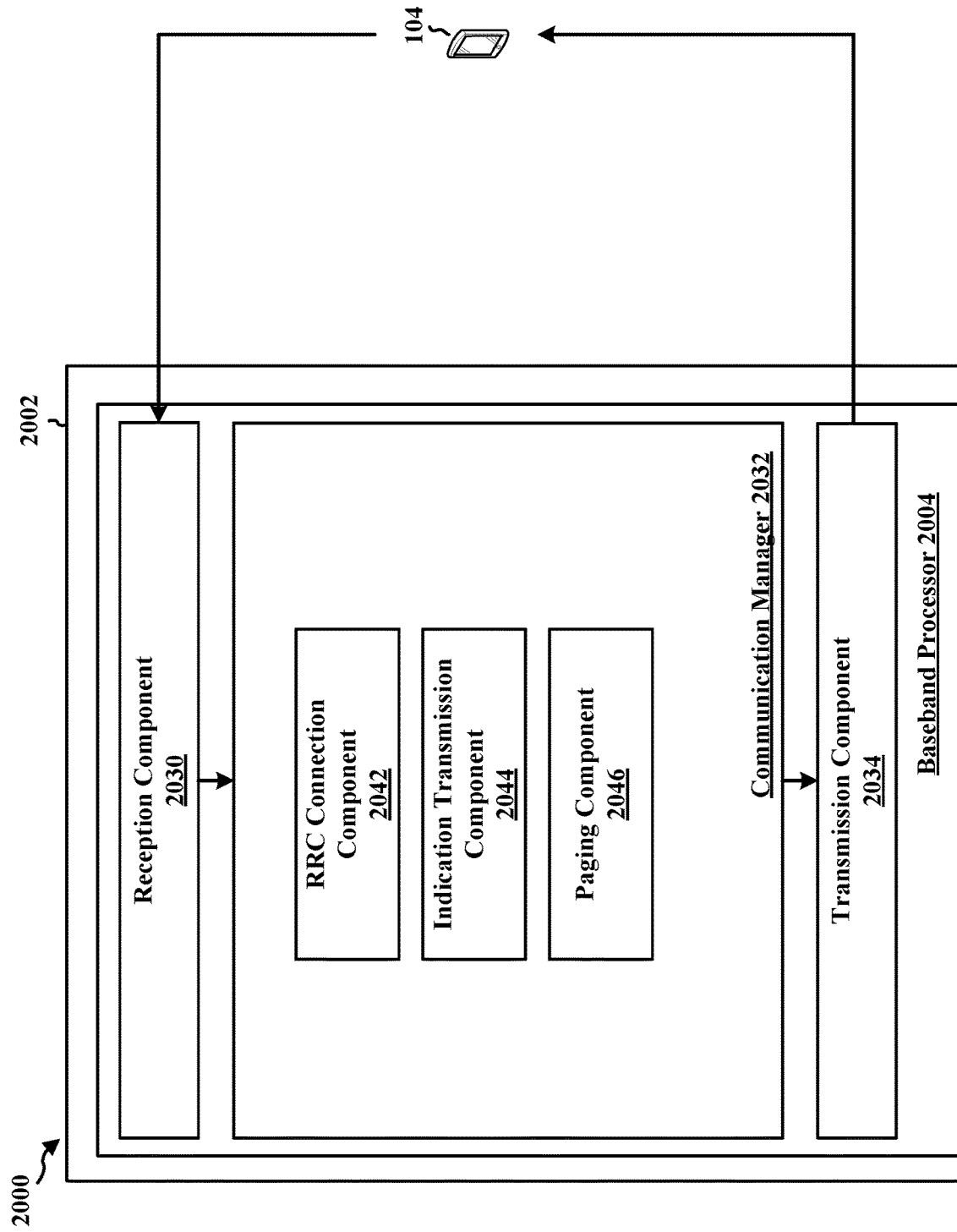
FIG. 20 is a diagram illustrating an example of a hardware implementation for an example apparatus.

FIG. 20 is a diagram 2000 illustrating an example of a hardware implementation for an apparatus 2002. The apparatus 2002 is a BS and includes a baseband processor 2004. The baseband processor 2004 may communicate through a cellular RF transceiver with the UE 104. The baseband processor 2004 may include a computer-readable medium/memory. The baseband processor 2004 is responsible for general processing, including the execution of software stored on the computer-readable medium/memory. The software, when executed by the baseband processor 2004, causes the baseband processor 2004 to perform the various functions described supra. The computer-readable medium/memory may also be used for storing data that is manipulated by the baseband processor 2004 when executing software. The baseband processor 2004 further includes a reception component 2030, a communication manager 2032, and a transmission component 2034. The communication manager 2032 includes the one or more illustrated components. The components within the communication manager 2032 may be stored in the computer-readable medium/memory and/or configured as hardware within the baseband processor 2004. The baseband processor 2004 may be a component of the BS 310 and may include the memory 376 and/or at least one of the TX processor 316, the RX processor 370, and the controller/processor 375.

The communication manager 2032 includes an RRC connection component 2042 that is configured to establish a radio resource control connection with a, e.g., as described in connection with connection 1902 of FIG. 19. The communication manager 2032 further includes an indication transmission component 2044 that is configured to transmit an indication of one or more parameters for paging based on the beam in RMSI or OSI e.g., as described in connection with transmission 1904 of FIG. 19. The communication manager 2032 further includes a paging component 2046 that is configured to transmit paging to the UE using one or more parameters based on a beam on which the paging is transmitted, e.g., as described in connection with transmission 1906 of FIG. 19.

The apparatus may include additional components that perform each of the blocks of the algorithm in the flowchart of FIG. 19. As such, each block in the flowchart of FIG. 19 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2002, and in particular the cellular baseband processor 2004, includes means for establishing a radio resource control connection with a. The cellular baseband processor 2004 further includes means for transmitting paging to the UE using one or more parameters based on a beam on which the paging is transmitted. In some aspects, the cellular baseband processor 2004 further includes means for transmitting an indication of the one or more parameters for paging based on the beam in RMSI or OSI. The means may be one or more of the components of the apparatus 2002 configured to perform the functions recited by the means. As described supra, the apparatus 2002 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to receive, from a base station, RMSI indicating beam-specific system information in association with one or more SSB beams for receiving an SSB; and receive the SSB from the base station based on the received RMSI indicating the beam-specific system information.

Aspect 2 is the apparatus of aspect 1, where the RMSI includes a header indicating the one or more SSB beams for which the beam-specific system information applies.

Aspect 3 is the apparatus of any of aspects 1 and 2, where the header indicates the one or more SSB beams through an SSB beam index for each of the one or more SSB beams.

Aspect 4 is the apparatus of any of aspects 1 to 3, where the header indicates the one or more SSB beams through an indication of an SSB beam subset of a set of SSB beams.

Aspect 5 is the apparatus of any of aspects 1 to 4, where the RMSI indicates other information associated with the one or more SSB beams for receiving the SSB, and the received beam-specific system information overrides the other information.

Aspect 6 is the apparatus of any of aspects 1 to 5, where the RMSI is received in an SIB1.

Aspect 7 is a method of wireless communication for implementing any of aspects 1 to 6.

Aspect 8 is an apparatus for wireless communication including means for implementing any of aspects 1 to 6.

Aspect 9 is a computer-readable medium storing computer executable code, where the code when executed by a processor causes the processor to implement any of aspects 1 to 6.

Aspect 10 is an apparatus for wireless communication including at least one processor coupled to a memory and configured to transmit, to a first UE, RMSI indicating beam-specific system information in association with one or more SSB beams for receiving an SSB; and transmit the SSB to the first UE based on the transmitted RMSI indicating the beam-specific system information.

Aspect 11 is the apparatus of aspect 10, where the RMSI includes a header indicating the one or more SSB beams for which the beam-specific system information applies.

Aspect 12 is the apparatus of any of aspects 10 and 11, where the header indicates the one or more SSB beams through an SSB beam index for each of the one or more SSB beams.

Aspect 13 is the apparatus of any of aspects 10 to 12, where the header indicates the one or more SSB beams through an indication of an SSB beam subset of a set of SSB beams.

Aspect 14 is the apparatus of any of aspects 10 to 13 where the RMSI indicates other information associated with the one or more SSB beams, and the transmitted beam-specific system information overrides the other information.

Aspect 15 is the apparatus of any of aspects 10 to 14, where the RMSI is also transmitted to a second UE, the other information is for the second UE, and the transmitted beam-specific system information is for the first UE.

Aspect 16 is the apparatus of any of aspects 10 to 15, where the transmitted beam-specific system information is compatible with the other information.

Aspect 17 is the apparatus of any of aspects 10 to 16, where the RMSI is transmitted in an SIB1.

Aspect 18 is a method of wireless communication for implementing any of aspects 10 to 17.

Aspect 19 is an apparatus for wireless communication including means for implementing any of aspects 10 to 17.

Aspect 20 is a computer-readable medium storing computer executable code, where the code when executed by a processor causes the processor to implement any of aspects 10 to 17.

Aspect 21 is an apparatus for wireless communication including at least one processor coupled to a memory and configured to establish a radio resource control connection with a base station; enter an idle mode; and monitor for paging from the base station based on a beam used to monitor for the paging.

Aspect 22 is the apparatus of aspect 21, where the UE monitors for the paging with a first beam using one or more parameters that increase paging coverage relative to a second beam.

Aspect 23 is the apparatus of any of aspects 21 and 22, where the paging includes one or more repetitions for paging DCI based on the beam.

Aspect 24 is the apparatus of any of aspects 21 to 23, where the paging includes one or more repetitions for a paging message based on the beam.

Aspect 25 is the apparatus of any of aspects 21 to 24, where the at least one processor is configured to: receive an indication of the one or more parameters for the paging based on the beam in RMSI or OSI.

Aspect 26 is the apparatus of any of aspects 21 to 25, where the RMSI or the OSI includes the indication of at least one additional monitoring occasion for the beam.

Aspect 27 is the apparatus of any of aspects 21 to 26, where the RMSI or the OSI includes the indication of monitoring aggregation for a paging DCI or a paging message for the beam.

Aspect 28 is the apparatus of any of aspects 21 to 27, where the RMSI or the OSI includes the indication of one or more repetitions for paging DCI or a paging message in a beam-specific field, and where the one or more repetitions includes a copy of the paging DCI and the paging message in one monitoring occasion.

Aspect 29 is a method of wireless communication for implementing any of aspects 21 to 28.

Aspect 30 is an apparatus for wireless communication including means for implementing any of aspects 21 to 28.

Aspect 31 is a computer-readable medium storing computer executable code, where the code when executed by a processor causes the processor to implement any of aspects 21 to 28.

Aspect 32 is an apparatus for wireless communication including at least one processor coupled to a memory and configured to establish a radio resource control connection with a UE; and transmit paging to the UE using one or more parameters based on a beam on which the paging is transmitted.

Aspect 33 is the apparatus of aspect 32, where the one or more parameters for a first beam increase paging coverage relative to the one or more parameters for a second beam.

Aspect 34 is the apparatus of any of aspects 32 and 33, where the one or more parameters includes at least one repetition for paging DCI based on the beam on which the paging is transmitted.

Aspect 35 is the apparatus of any of aspects 32 to 34, where the one or more parameters includes at least one repetition for a paging message based on the beam on which the paging is transmitted.

Aspect 36 is the apparatus of any of aspects 32 to 35, where the at least one processor is further configured to: transmit an indication of the one or more parameters for the paging based on the beam in RMSI or OSI.

Aspect 37 is the apparatus of any of aspects 32 to 36, where the RMSI or the OSI includes the indication of at least one additional monitoring occasion for the paging on the beam.

Aspect 38 is the apparatus of any of aspects 32 to 37, where at least one monitoring occasion corresponds to a paging occasion for the UE without a capability for monitoring for the paging based on a paging configuration for the beam.

Aspect 39 is the apparatus of any of aspects 32 to 38, where the RMSI or the OSI includes the indication of beam-specific monitoring aggregation for paging DCI or a paging message for the paging on the beam.

Aspect 40 is the apparatus of any of aspects 32 to 39, where the RMSI or the OSI includes the indication of one or more repetitions for paging DCI or a paging message in a beam-specific field for the paging on the beam, and where the one or more repetitions includes a copy of the paging DCI and the paging message.

Aspect 41 is a method of wireless communication for implementing any of aspects 32 to 40.

Aspect 42 is an apparatus for wireless communication including means for implementing any of aspects 32 to 40.

Aspect 43 is a computer-readable medium storing computer executable code, where the code when executed by a processor causes the processor to implement any of aspects 32 to 40.

What is claimed is:

1. An apparatus for wireless communication at a user equipment (UE), comprising:
 a memory; and
 at least one processor coupled to the memory and configured to:
  receive, from a base station, remaining minimum system information (RMSI) indicating beam-specific system information in association with coverage enhancement for one or more synchronization signal block (SSB) beams for receiving an SSB, wherein the one or more SSB beams are stronger compared to other SSB beams or are above a threshold under the coverage enhancement; and receive the SSB from the base station based on the received RMSI indicating the beam-specific system information.

2. The apparatus of claim 1, wherein the RMSI includes a header indicating the one or more SSB beams for which the beam-specific system information applies.

3. The apparatus of claim 2, wherein the header indicates the one or more SSB beams through an SSB beam index for each of the one or more SSB beams.

4. The apparatus of claim 2, wherein the header indicates the one or more SSB beams through an indication of an SSB beam subset of a set of SSB beams.

5. The apparatus of claim 1, wherein the RMSI indicates other information associated with the one or more SSB beams for receiving the SSB, and the received beam-specific system information overrides the other information.

6. The apparatus of claim 1, wherein to receive the RMSI, the at least one processor is configured to receive the RMSI in a system information block 1 (SIB1).

7. A method of wireless communication at a user equipment (UE), comprising:
receiving, from a base station, remaining minimum system information (RMSI) indicating beam-specific system information in association with coverage enhancement for one or more synchronization signal block (SSB) beams for receiving an SSB, wherein the one or more SSB beams are stronger compared to other SSB beams or are above a threshold under the coverage enhancement; and
receiving the SSB from the base station based on the received RMSI indicating the beam-specific system information.

8. The method of claim 7, wherein the RMSI includes a header indicating the one or more SSB beams for which the beam-specific system information applies.

9. The method of claim 8, wherein the header indicates the one or more SSB beams through an SSB beam index for each of the one or more SSB beams.

10. The method of claim 8, wherein the header indicates the one or more SSB beams through an indication of an SSB beam subset of a set of SSB beams.

11. The method of claim 7, wherein the RMSI indicates other information associated with the one or more SSB beams for receiving the SSB, and the received beam-specific system information overrides the other information.

12. The method of claim 7, wherein the RMSI is received in a system information block 1 (SIB1).

13. An apparatus for wireless communication at a base station (BS), comprising:
a memory; and
at least one processor coupled to the memory and configured to:
transmit, to a first user equipment (UE), remaining minimum system information (RMSI) indicating beam-specific system information in association with coverage enhancement for one or more synchronization signal block (SSB) beams for receiving an SSB, wherein the one or more SSB beams are stronger compared to other SSB beams or are above a threshold under the coverage enhancement; and
transmit the SSB to the first UE based on the transmitted RMSI indicating the beam-specific system information.

14. The apparatus of claim 13, wherein the RMSI includes a header indicating the one or more SSB beams for which the beam-specific system information applies.

15. The apparatus of claim 14, wherein the header indicates the one or more SSB beams through an SSB beam index for each of the one or more SSB beams.

16. The apparatus of claim 14, wherein the header indicates the one or more SSB beams through an indication of an SSB beam subset of a set of SSB beams.

17. The apparatus of claim 13, wherein the RMSI indicates other information associated with the one or more SSB beams, and the transmitted beam-specific system information overrides the other information.

18. The apparatus of claim 17, wherein to transmit the RMSI, the at least one processor is configured to further transmit the RMSI to a second UE, wherein the other information is for the second UE, and the transmitted beam-specific system information is for the first UE.

19. The apparatus of claim 18, wherein the transmitted beam-specific system information is compatible with the other information.

20. The apparatus of claim 13, wherein to transmit the RMSI, the at least one processor is configured to transmit the RMSI in a system information block 1 (SIB1).

21. A method of wireless communication at a base station (BS), comprising:
transmitting, to a first user equipment (UE), remaining minimum system information (RMSI) indicating beam-specific system information in association with coverage enhancement for one or more synchronization signal block (SSB) beams for receiving an SSB, wherein the one or more SSB beams are stronger compared to other SSB beams or are above a threshold under the coverage enhancement; and
transmitting the SSB to the first UE based on the transmitted RMSI indicating the beam-specific system information.

22. The method of claim 21, wherein the RMSI includes a header indicating the one or more SSB beams for which the beam-specific system information applies.

23. The method of claim 22, wherein the header indicates the one or more SSB beams through an SSB beam index for each of the one or more SSB beams.

24. The method of claim 22, wherein the header indicates the one or more SSB beams through an indication of an SSB beam subset of a set of SSB beams.

25. The method of claim 21, wherein the RMSI indicates other information associated with the one or more SSB beams, and the transmitted beam-specific system information overrides the other information.

26. The method of claim 25, wherein the RMSI is also transmitted to a second UE, the other information is for the second UE, and the transmitted beam-specific system information is for the first UE.

27. The method of claim 26, wherein the transmitted beam-specific system information is compatible with the other information.

28. The method of claim 21, wherein the RMSI is transmitted in a system information block 1 (SIB1).

* * * * *